June 10, 1952

C. A. NERACHER ET AL 2,599,773

POWER TRANSMISSION

Filed Jan. 9, 1941

INVENTORS.
Carl A. Neracher,
William T. Dunn.
BY
ATTORNEYS.

June 10, 1952  C. A. NERACHER ET AL  2,599,773
POWER TRANSMISSION
Filed Jan. 9, 1941  12 Sheets-Sheet 5

FIG. 8-C.

INVENTORS.
Carl A. Neracher,
William T. Dunn.
BY
Harness, Dickey, Pierce & Harris
ATTORNEYS.

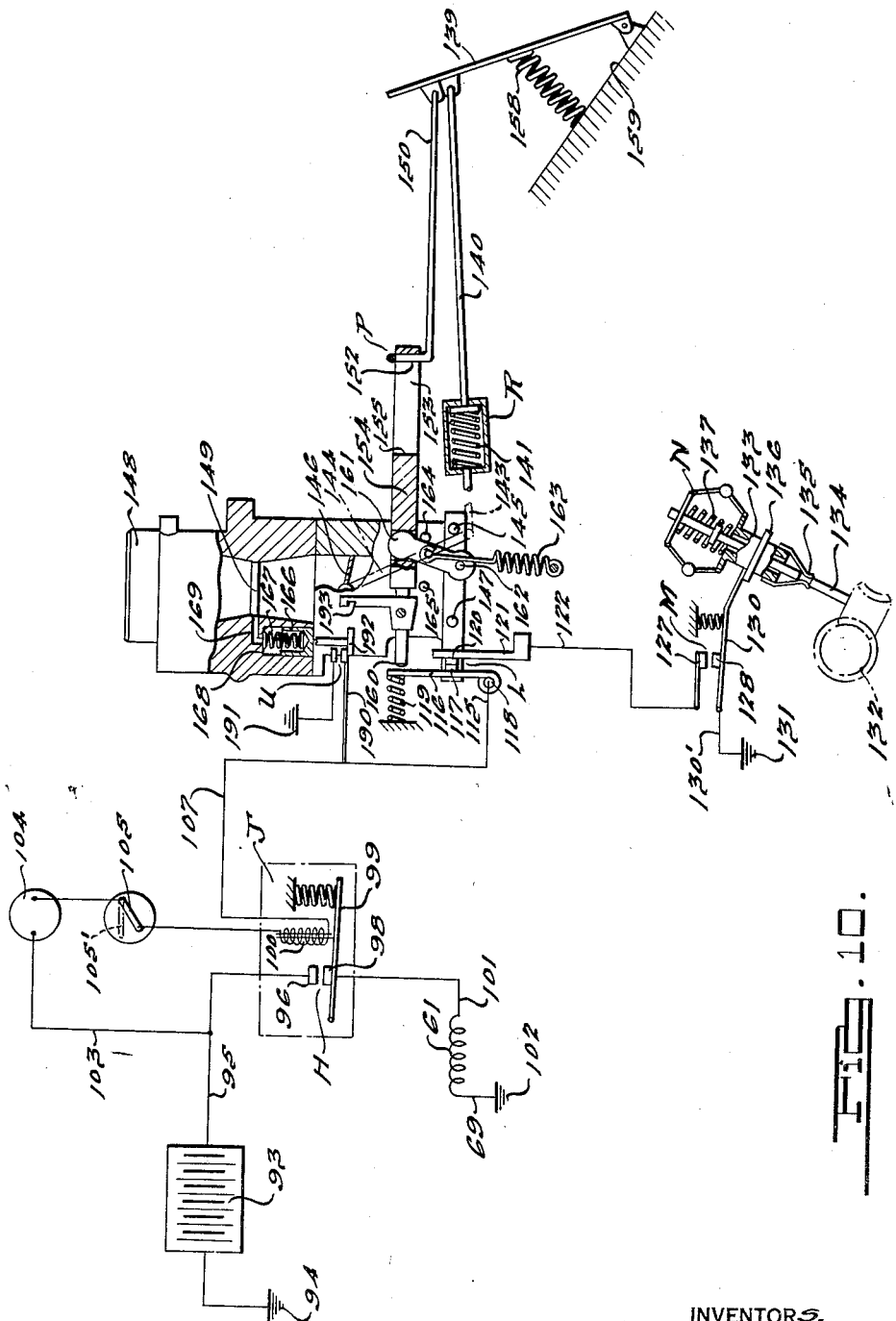

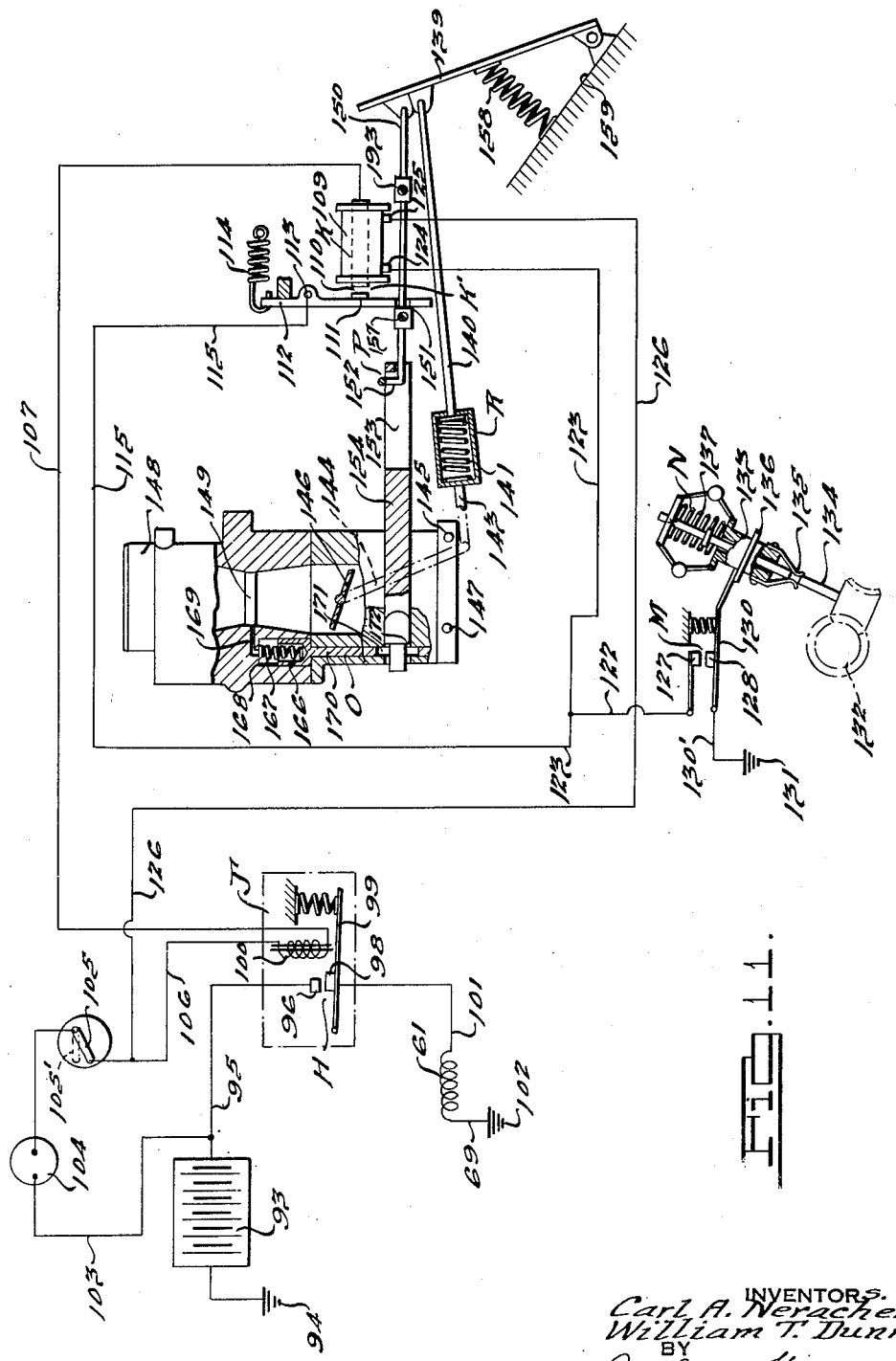

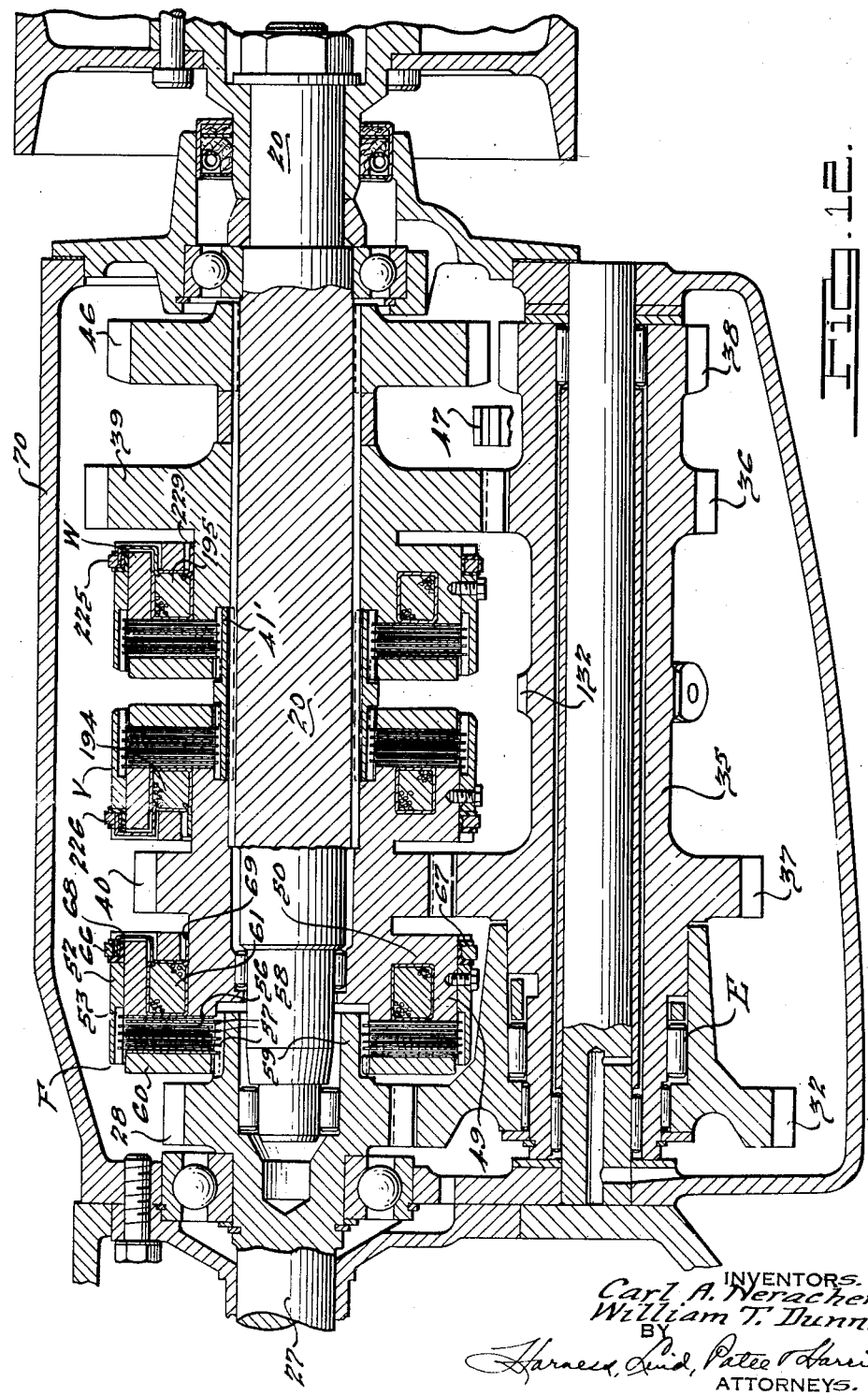

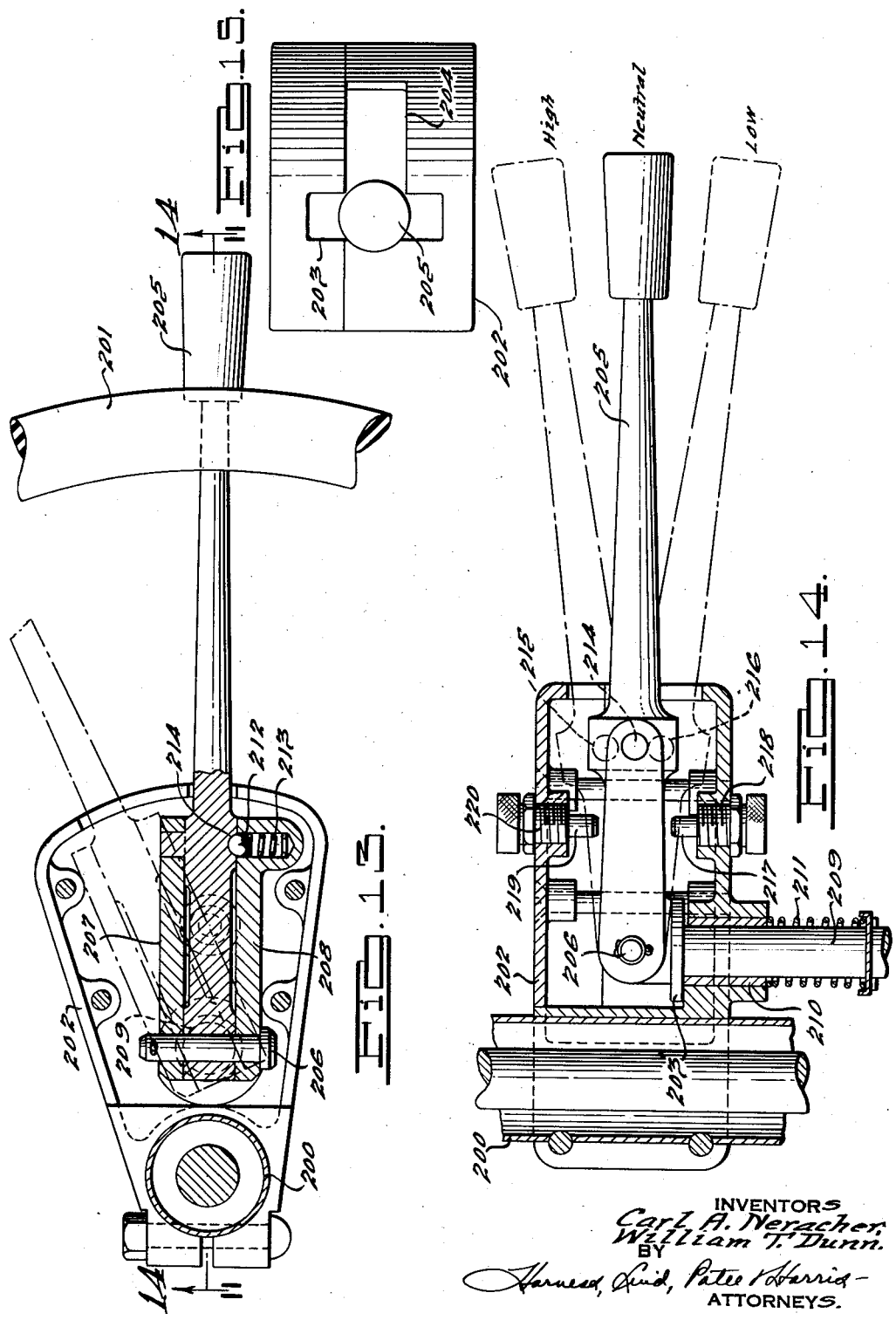

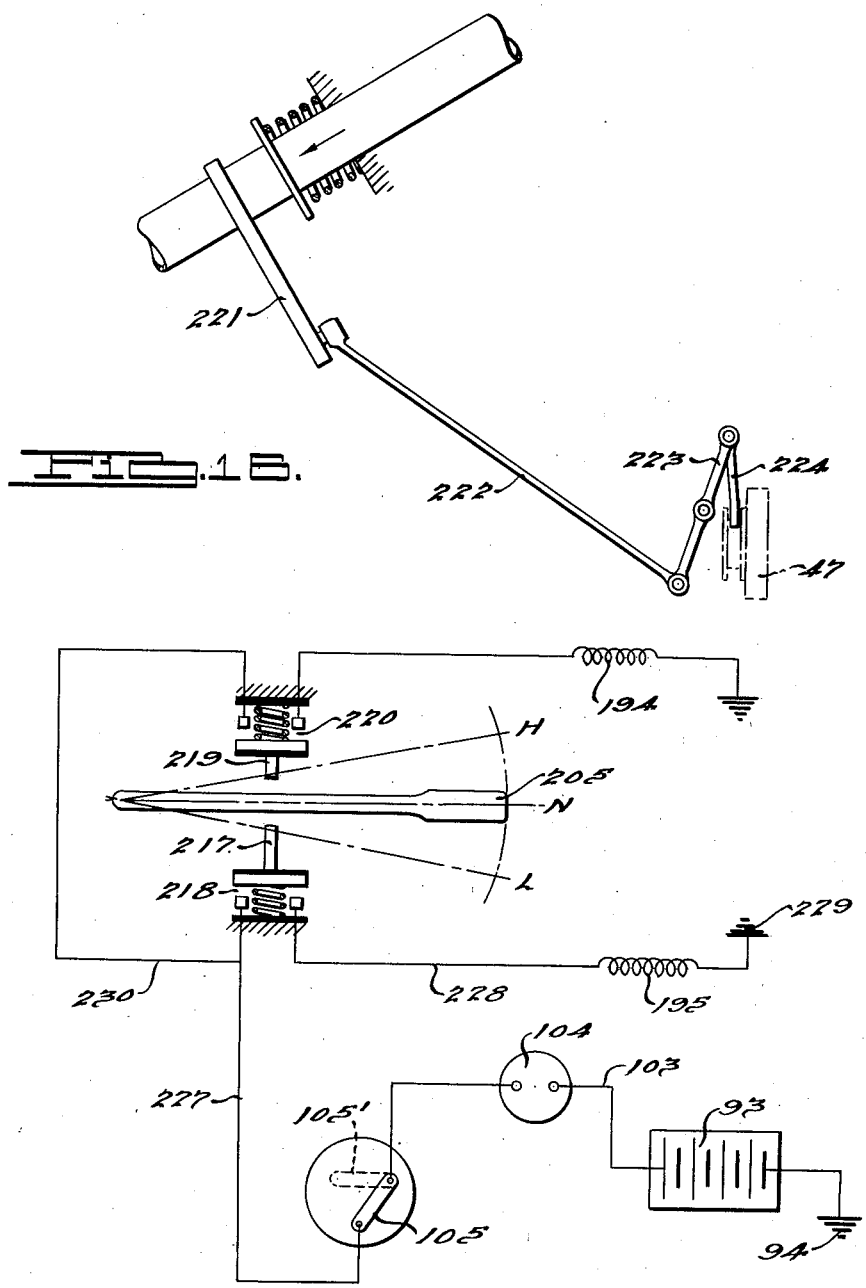

Patented June 10, 1952

2,599,773

UNITED STATES PATENT OFFICE 2,599,773

POWER TRANSMISSION

Carl A. Neracher and William T. Dunn, Detroit, Mich., assignors to Chrysler Corporation, Highland Park, Mich., a corporation of Delaware Application January 9, 1941, Serial No. 373,756

112 Claims. (Cl. 74—472)

1

This invention relates to motor vehicles and refers more particularly to improvements in power transmission therefor.

It is an object of our invention to provide a simplified change speed mechanism of the type embodying electromagnetic control means.

Another object is to provide an electromagnetic control device adapted to control step-up and step-down change in the transmission drive, the electromagnetic device being preferably arranged to step-up the drive only when the transmission is under coast load relative to the engine. By reason of such arrangement the electromagnetic device, which may be in the form of a clutch or brake, may be made relatively small and will function with very little current demand.

A further object is to provide an improved control system for the electromagnetic device whereby one or more controls are provided to de-energize the electromagnetic device thereby releasing a speed ratio drive in the transmission. One of these de-energizing controls is preferably under control of the vehicle driver and may comprise a hand or foot operated element; another de-energizing control preferably comprises means responsive to predetermined speed of travel of the vehicle such that the speed ratio drive is automatically released on bringing the vehicle to a stop and automatically set for step-up drive on accelerating the car from rest.

Another object is to provide an improved so-called kick-down control for step-down in the transmission drive under open throttle conditions wherein the kick-down, by preference, is rendered inoperative above a predetermined vehicle driving speed by an improved control on the kick-down mechanism.

A further object is to provide an improved transmission drive embodying an overrunning drive in conjunction with a two-way drive under control of an electromagnetic device such that the two-way drive is established during engine coast from the one-way drive and such that the one-way drive is established during engine drive when the two-way drive is released by de-energizing the electromagnetic device.

Another object is to provide an improved electromagnetic control for a vehicle transmission.

A still further object is to provide a transmission having high and low ranges of speed ratio drive each under control of an electromagnetic device preferably in conjunction with step-up and step-down in each driving range under control of another electromagnetic device functioning according to any of the aforesaid objects.

2

Another object is to provide a simple and convenient drive control for selectively controlling energization of a plurality of devices for controlling speed ratio change and for manipulating the transmission for a reverse drive by mechanically operating shift means.

A further object is to provide a combined kick-down and holding switch control for step-up and step-down speed ratio change in response to driver manipulation of a control element preferably in the form of a throttle-operating accelerator pedal.

Further objects and advantages of our invention reside in the novel combination and arrangement of parts and control systems as more particularly hereinafter described, reference being made to the accompanying drawings illustrative of several embodiments of our invention, in which:

Fig. 5A is a modified showing of a part of the Fig. 5 mechanism.

Fig. 6A is a view of a portion of the Fig. 6 control system illustrating an addition thereto for driver control of the drive control device.

Fig. 6B is a view illustrating an alternative arrangement as an addition to the Fig. 6 system.

Fig. 6C is a view illustrating another alternative arrangement of the Fig. 6 control system.

Fig. 10 is a further view generally corresponding to Fig. 6 but illustrating a further modified control system.

Fig. 11 is a view generally similar to Fig. 6 but showing another modified control system.

Fig. 12 is a view generally similar to Fig. 3 but illustrating a modified arrangement of transmission control.

Fig. 13 is a sectional plan view illustrating the manual control for the Fig. 12 transmission.

Fig. 14 is a sectional elevational view taken as indicated by line 14—14 of Fig. 13.

Fig. 15 is an end view of the Fig. 13 control.

Fig. 16 is a somewhat diagrammatic view illustrating the reverse shift mechanism for the Fig. 13 control.

Fig. 17 is a diagram illustrating the control system for a portion of the Fig. 12 transmission.

Figure 1:
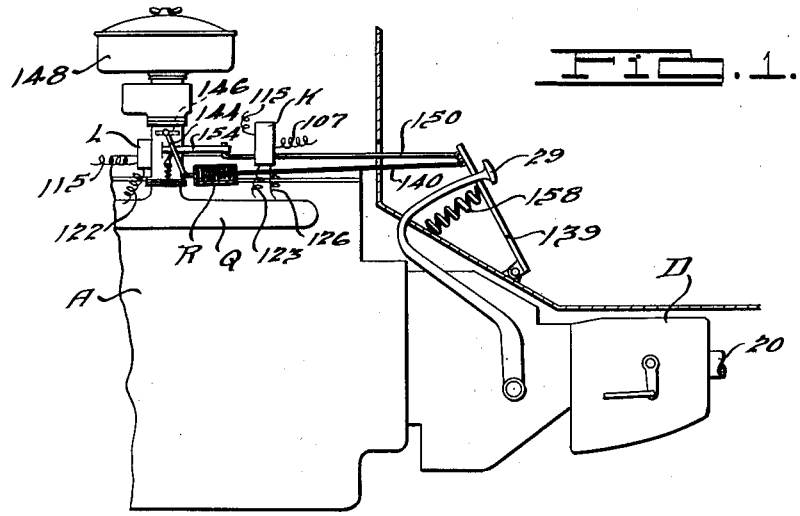
Fig. 1 is a side elevational view illustrating the motor vehicle engine and power transmission.

Referring to the drawings, we have illustrated our invention in connection with a motor vehicle driving system wherein one or more pairs of relatively engageable drive control elements are arranged to control a transmission drive, the drive control elements being in the form of a clutch or brake and preferably of the frictionally engageable magnetically controlled type as will be presently more apparent.

Reference character A (Figure 1) represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D where such shifts depend on engagement of gears or positive type clutches.

Figure 3:
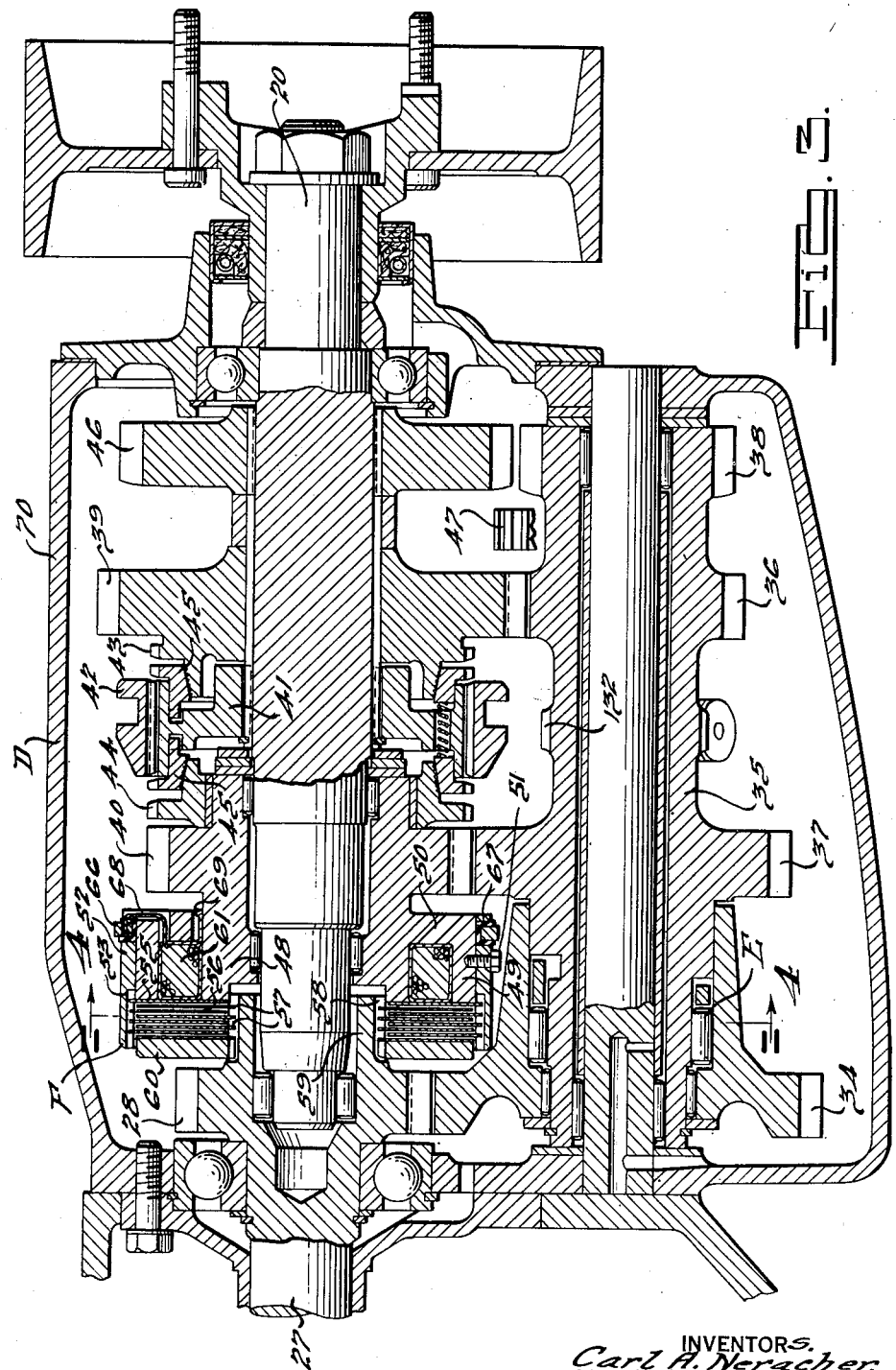
Fig. 3 is a similar view through the change speed transmission.

Referring to the transmission of Fig. 3, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is adapted for operation by any suitable means under shifting control of the vehicle driver. If desired, blocker synchronizer rings 45 may be located between sleeve 42 and teeth 43, 44 to insure synchronized shift of sleeve 42 as is now well known and as set forth in the copending application of O. E. Fishburn, Serial No. 180,840, filed December 20, 1937, now Patent No. 2,333,165, issued November 2, 1943.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver by manipulation of sleeve 42 or gear 47, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler 47 into mesh with gears 38, 46, sleeve 42 being in neutral, the reverse drive passing from the engine to the countershaft 35 as before, thence through gears 38, 47 and 46 to shaft 20.

We have provided clutching means for operably connecting pinion 28 with gear 40 so as to step-up the speed ratio drive from first to second and from third to fourth which is a direct drive speed ratio. Such arrangement of functional drive control is set forth in the copending application of Carl A. Neracher et al., Serial No. 335,310, filed May 15, 1940, now Patent No. 2,455,943, issued December 14, 1948, wherein this clutching means is in the form of a positive engaging clutch requiring torque unloading means to effect disengagement of the clutch for kick-down under open throttle or engine drive conditions. In our present invention we employ clutch means, or brake means as in Fig. 5, of a type which does away with the necessity for torque interruption thereby greatly simplifying the control system and rendering the transmission more fool-proof. Furthermore, we now provide a frictionally engaging drive control means so arranged, in the preferred embodiment of our invention, that engagement of the drive control means is limited to coast conditions of the engine or when the torque flow through the transmission is in the opposite or reverse direction from the normal torque flow direction from the engine to the vehicle. Such arrangement insures against engagement of the friction drive control when the engine is driving the car, thereby avoiding any lurching or torque shock on the transmission or vehicle passengers. Also, such arrangement allows the use of a friction drive control of relatively small torque capacity. This is of considerable importance, especially where the friction drive control is electromagnetically energized. In such controls the amount of electrical energy is limited and available space and cost factors work against the use of too large size control devices. Furthermore such friction control devices, when made to engage as a pick-up drive during delivery of engine torque tend to wear excessively and also to slip more than desired.

In Fig. 3 the frictionally engageable drive control means comprises an electromagnetic clutch device F. This device comprises a flux-conducting coil-receiving body having inner annulus portion 48 and outer annulus portion 49 connected at 50 preferably as an integral projection of gear 40. Surrounding annulus 49, and mechanically secured thereto as by screws 51, or by a pressed fit or by welding, is a ring 52 which projects forwardly beyond portion 49. This projecting portion is provided with the internal splines 53 for receiving the tongues 54 (Fig. 4) of the thin flux-conducting friction driven elements or disks 55. Between adjacent disks 55 there is a generally similar driving element or disc 56 which however terminate outwardly short of the ring 52 but which have inner tongues 57 for engagement with the splines 58 of the rear extension 59 of drive pinion 28. A pressure plate 60 is also splined at 58, the disks 55, 56 being disposed in closely associated relationship between plate 60 and the axially projecting ends of annuli 48, 49. A flux-forming coil 61 is disposed between these annuli such that when the coil is energized the plate 60 and disks 55, 56 are drawn toward annuli 48, 49 serving to frictionally pack the disks together and thereby drivingly connect pinion 28 with gear 40. The electromagnetic clutch F is therefore controlled by energization of coil 61 which causes a magnetic flux circuit to be formed in a path around the coil, viz., comprising annulus 49 through discs 55, 56 to plate 60 thence through the disks to annulus 48 and portion 50 back to annulus 49.

A small portion of the flux in said magnetic circuit is shunted at each disk 55, 56 but this is utilized to also draw the disks tightly together. To insure most of the magnetic flux following the complete circuit, each disk 55, 56 is formed with a plurality of axial slots 62 (Figure 4) therethrough, these slots being registered with each other so that most of the flux circuit is prevented from shunting through the disks and is made to travel through plate 60. In order to prevent warping of the disks and impart added fluxibility thereto they may be slotted as at 63, 63' thus facilitating a tight packing of the disks under action of the magnetic flux generated at coil 61. Furthermore, to facilitate slight separation of disks 55, 56 when coil 61 is de-energized thereby minimizing friction loss, heat generation, and oil drag from the lubricant in the transmission, portions of the disks may be deflected so as to bias them into relative disengagement without interfering with their tightly packing relationship when coil 61 is energized. To this end, alternate disks such as the disks 55 may have terminal portions adjacent slots 63' slightly deflected out of their general radial planes as at 64, 65. One portion is deflected axially in a direction opposite to that of the other with the result that the disks 55, 56 are biased into slight separation from each other when clutch F is released. If desired outer portions of the disks 55 may also be deflected or each disk may have a deflected portion so long as the deflections are not such that they can nest together and thereby defeat their purpose. It is, of course, not entirely essential that the disks be biased into separation as they will tend to separate when coil 61 is de-energized.

Figure 4:
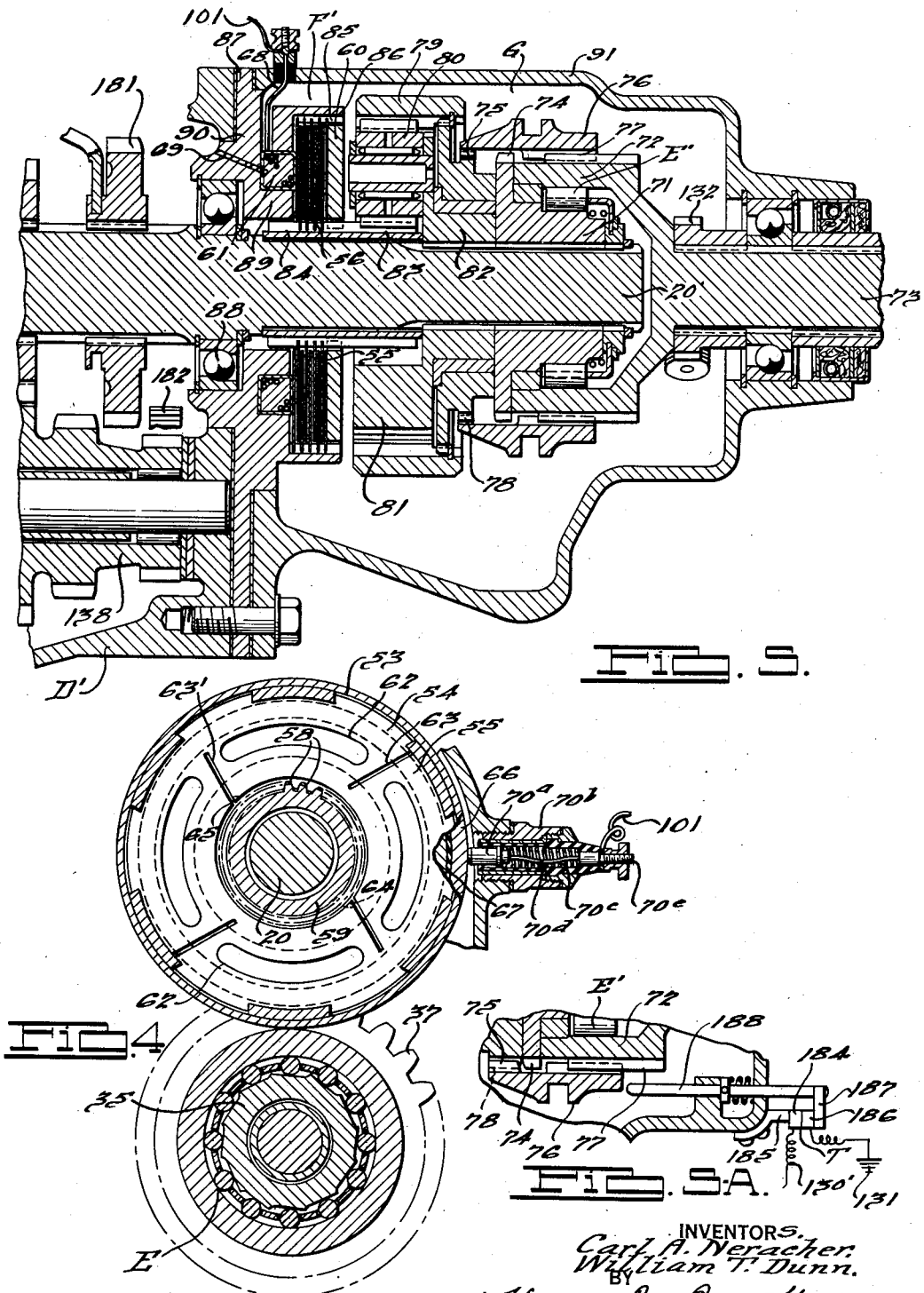
Fig. 4 is a detail sectional elevational view according to line 4—4 as viewed in Fig. 3.

Inasmuch as coil 61 rotates with gear 40, some form of collector ring is necessary to energize the coil. In Figs. 3 and 4 the conductor collector ring 66 is seated in an insulating channel 67 which, in turn, seats in a groove formed in ring 52 such that rings 66 and 52 rotate together.

One end of the coil 61 extends as at 68 to ring 66 while the other end 69 is suitably grounded as by brazed or soldered connection with gear 40. This ground may be taken at gear 40 or any part of the transmission as they are all in conducting relationship. Likewise the gearing is in conducting relationship with the casing 10 of the transmission and with other grounds of the electrical control system hereinafter referred to.

The circuit is taken to the collector ring 66 and thence to coil 61 by a brush conductor 70ª in the form of a metallic plunger or carbon plunger constantly engaging ring 66. The plunger is mounted in the stationary insulating carrier assembly 70ᵇ so that it is fixed against rotation and is yieldingly urged inwardly into contact with ring 66 by a spring 70ᶜ. The conductor 70ª is electrically connected by flexible conductor 70ᵈ to the terminal 70ᵉ.

The control device F is adapted to step-up the speed ratio drive from first to second and from third to fourth or direct. By preference, we provide control means limiting operation of device F, to drivingly connect pinion 28 with gear 40, to predetermined minimum and maximum car driving speed, to a condition of coast of the engine, and to other conditions under control of the vehicle driver.

When driving in first, second is obtained under predetermined conditions by energizing device F preferably during engine coast. When this occurs, the engine along with shaft 27, pinion 28 and gear 34 all slow down while shaft 20 along with gears 39 and 36 continue their speeds by accommodation of clutch E which then overruns. As coil 61 is energized it will be apparent that the frictional engagement of disks 55, 56 assists the engine in rapidly slowing down until pinion 28 is rotating at the same speed as gear 40 at which time shaft 27 is held in 1 to 1 drive ratio with respect to gear 40 by the device F. This device therefore acts as a power synchronizing means but as its energization is, by preference, limited to engine coast, a relatively small size and capacity of device may be employed and there will not be any harshness in its action.

When device F is thus energized on coast, there results a two-way drive through the transmission for second as follows: pinion 28 through device F to gear 40 thence through gears 37, 36 and 39 to sleeve 42 and shaft 20, the clutch E overrunning.

When driving in third, fourth or direct is obtained just as for second by energizing device F. The direct drive is also a two-way drive as follows: pinion 28 through device F to gear 40 thence directly through sleeve 42 to shaft 20, clutch E overrunning as before.

While the engine is driving in second or fourth, under certain conditions, device F is de-energized for a kickdown control on the transmission thereby effecting a step-down in the transmission drive to either first or third merely by effecting de-energization of coil 61. Under such conditions the device F releases whereupon the engine rapidly speeds up to cause clutch E to engage for the drive in first or third.

Before describing our control system for device F we will describe a typical embodiment of our drive control acting as a brake instead of a clutch and wherein the coil 61 is stationary. In order to illustrate an arrangement of this class, we have shown in Fig. 5 certain portions of an overdrive transmission widely used commercially at this time although speed ratios other than overdrive may be employed if desired.

Figure 2:
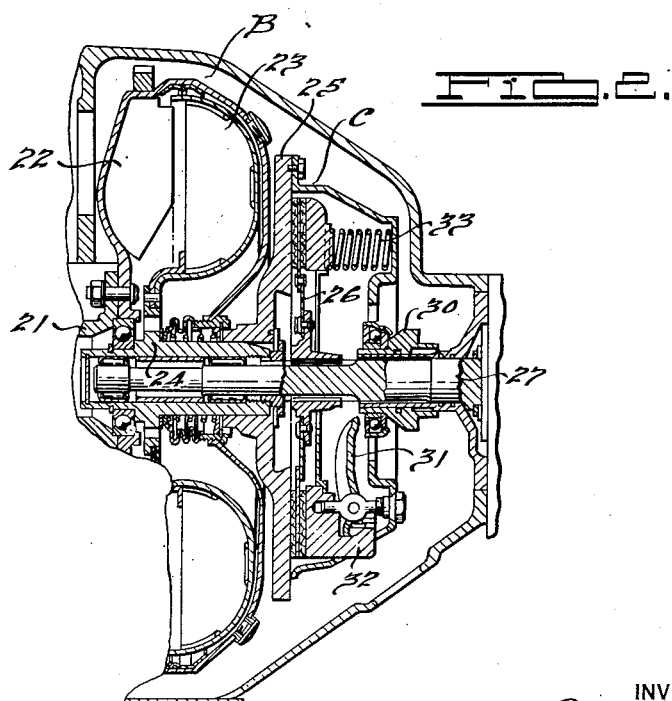
Fig. 2 is a longitudinal sectional elevational view through the main clutching mechanism embodying our clutch control device.
Figure 5:
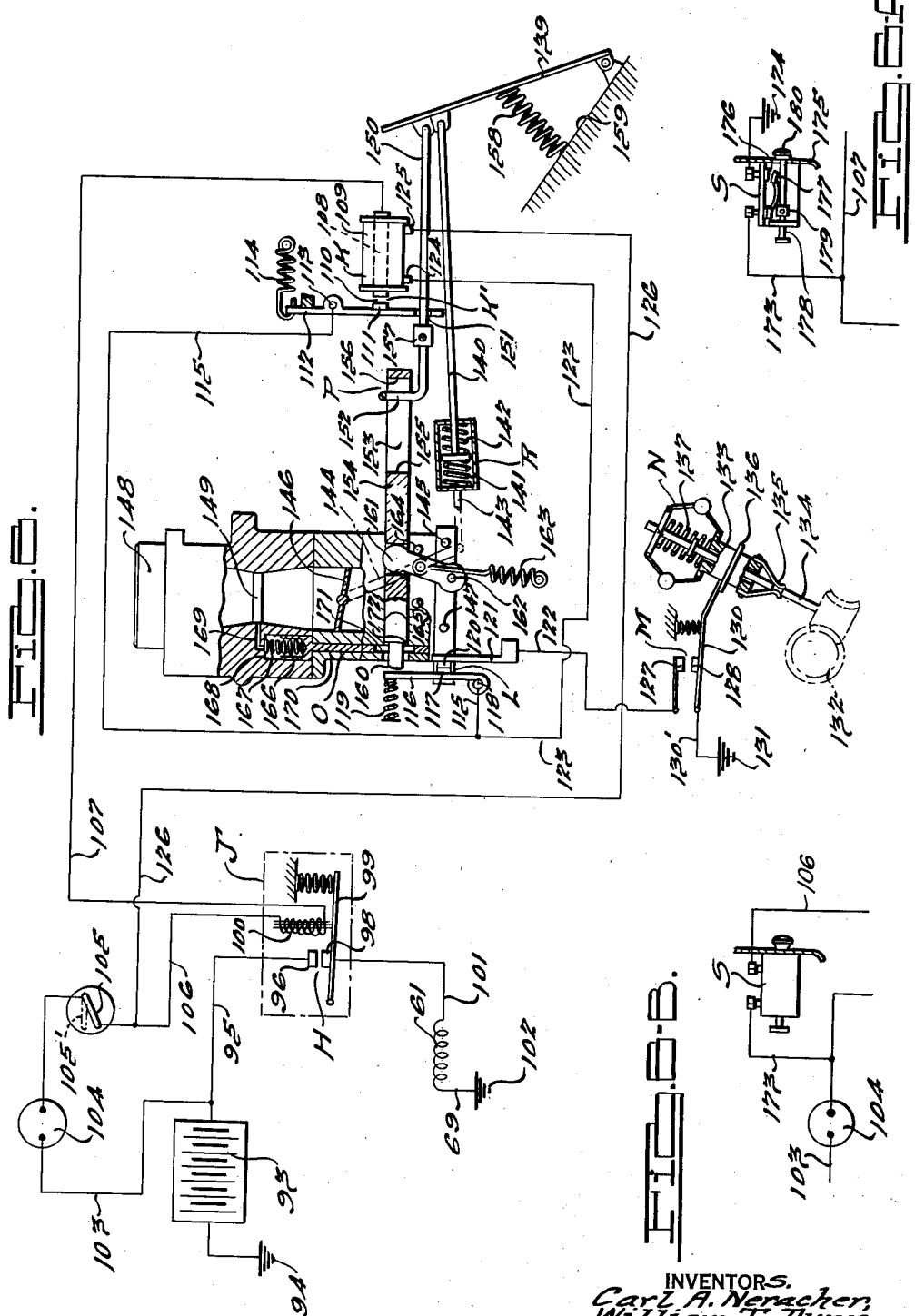
Fig. 5 is a sectional elevational view through another type of change speed mechanism illustrating our control device in the form of a brake.

In Fig. 5, the engine transmits its drive as in Fig. 2 to a transmission D' which may be of the present day standard commercial type having three forward and one reverse drive ratio. The output shaft 20' now drives the inner member 71 of an overrunning clutch E', the outer member 72 thereof comprising a forward extension of the final driving shaft 73. In order to transmit a two-way direct drive between shafts 20' and 73, especially for driving the car in reverse, the member 71 has a set of clutch teeth 74 engageable with teeth 75 of shift sleeve 76 when the latter is shifted rearwardly from its illustrated normal driving position. Sleeve 76 is splined at 77 to member 72 and when shifted rearwardly will effect direct two-way connection between shafts 20' and 73.

When sleeve 76 is shifted forwardly to its illustrated position, teeth 75 are clutched with teeth 78 drivingly connected to annulus gear 79 meshing with planet pinions 80 whose carrier 81 is fixed to shaft 20' at the carrier hub 82. The sun gear 83 of the planetary gear set has a forward control extension at 84 for splined connection with pressure plate 60 and disks 56 of the control device F'. The co-acting disks 55 are always stationary, being splined at 85 to the outer annulus 86 which is an integral part of the stationary casing support 87 for mounting bearing 88 which journals shaft 20'. The support 87 has an integral inner annulus 89 and a body portion 90. When the coil 61 is energized as before, the magnetic flux path or circuit is provided by annuli 86 and 89, portion 90 and the disks 56, 57 to plate 60. As the coil 61 is now stationary, the collector ring 66 may be dispensed with, one end of the coil 68 extending through the casing 91 of the planetary gearing transmission which is generally designated as G. The other end 69 of the coil is grounded to the body 90 so as to have a common ground with other grounds of the circuits hereinafter described.

In the operation of the transmission G, when coil 61 is de-energized then sun gear 83 is free and forward rotation of shaft 20' from transmission D' will drive the shaft 73 at a 1 to 1 ratio through the overrunning clutch E', assuming teeth 75 to be clutched with teeth 78 for normal forward drive conditions of the car. Under conditions as briefly outlined for the control device F, the coil 61 of control device F' is energized to cause plate 60 to be forced toward the ends of annuli 86, 89 by magnetic action, supplemented by shunt circuits through the disks 56, 57 as before, thereby tightly packing the disks together and holding sun 83 with the stationary support 87. With the sun fixed against rotation, then forward rotation of shaft 20' operates through carrier 81 and planet pinions 80 to rotate annulus 79 along with sleeve 76 and shaft 73 at a speed faster than that of shaft 20', commonly called an overdrive.

During the overdrive, the overrunning clutch E' is free, the outer part 72 rotating faster than the inner part 71. By releasing the sun 83, as by de-energizing coil 61 during engine drive of shaft 20', the engine will operate substantially as before to rapidly speed up until overrunning clutch E' operates to drivingly connect shaft 73 to shaft 20' for a direct one-way drive. Then when the coil 61 is again energized, preferably during engine coast, the engine slows down because of a closed throttle condition assisted by operation of control device F' and the sun 83 becomes stationary to again effect the two-way drive at an overdrive ratio through the planetary pinions 80.

When it is desired to drive the car in reverse, sleeve 76 is shifted rearwardly to clutch teeth 75 with teeth 74 thereby directly connecting shaft 20' with shaft 73 around the clutch E'. This shift is preferably operated as an incident to manipulating transmission D' for a reverse setting as is customary in planetary overdrive devices now in common use. Also, when desired, sleeve 76 may be shifted rearwardly by the driver for forward drive conditions thereby releasing teeth 78 from connection with shaft 73 and rendering the overdrive inoperative. At the same time this will provide a permanent two-way direct drive between shafts 20' and 73 until sleeve 76 is again shifted forwardly to clutch with teeth 78.

Figure 6:
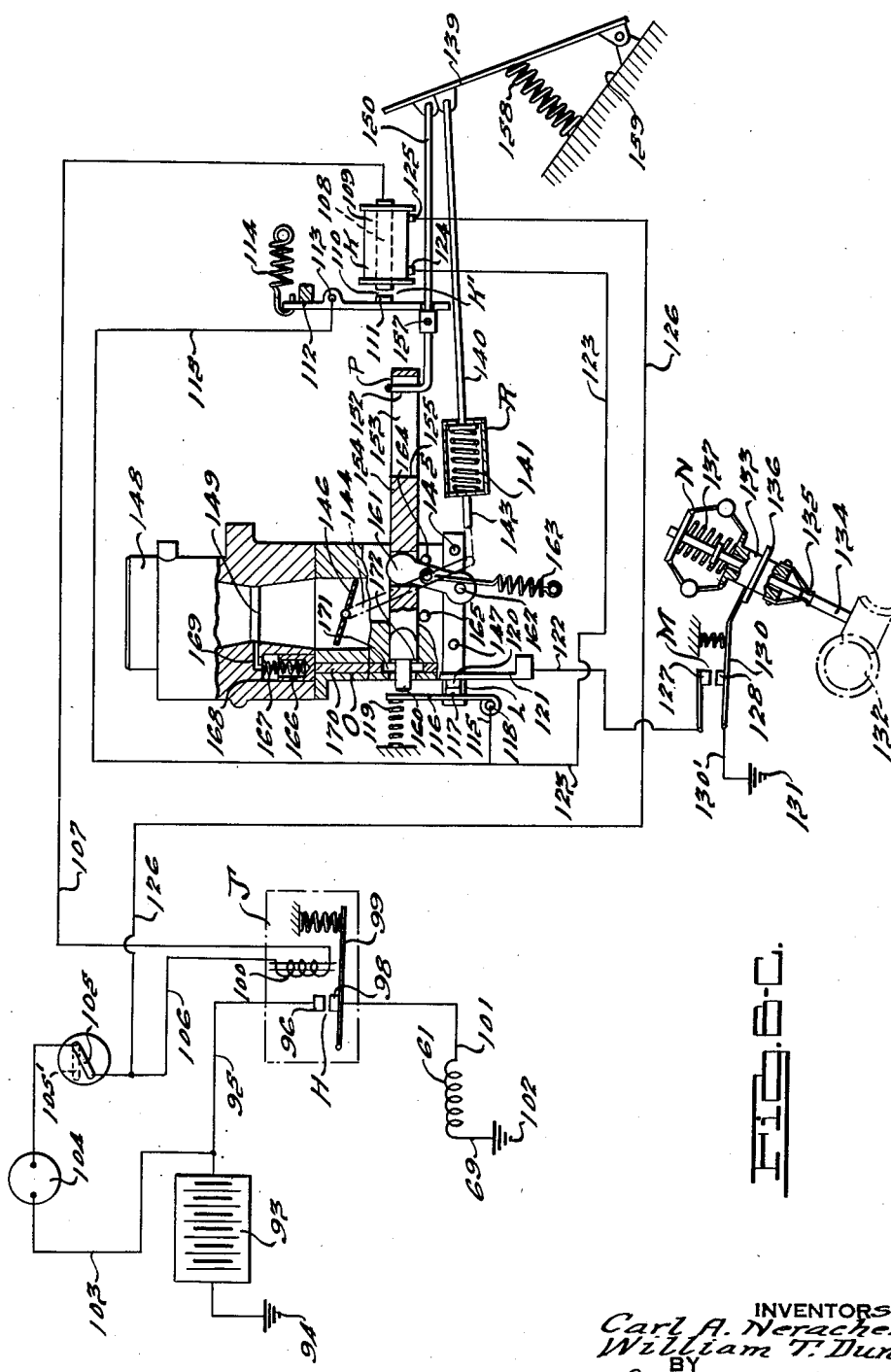
Fig. 6 is a diagrammatic view of the control mechanism for the Fig. 3 clutching device of Fig. 2 and for the Fig. 5 braking device.
Figure 7:
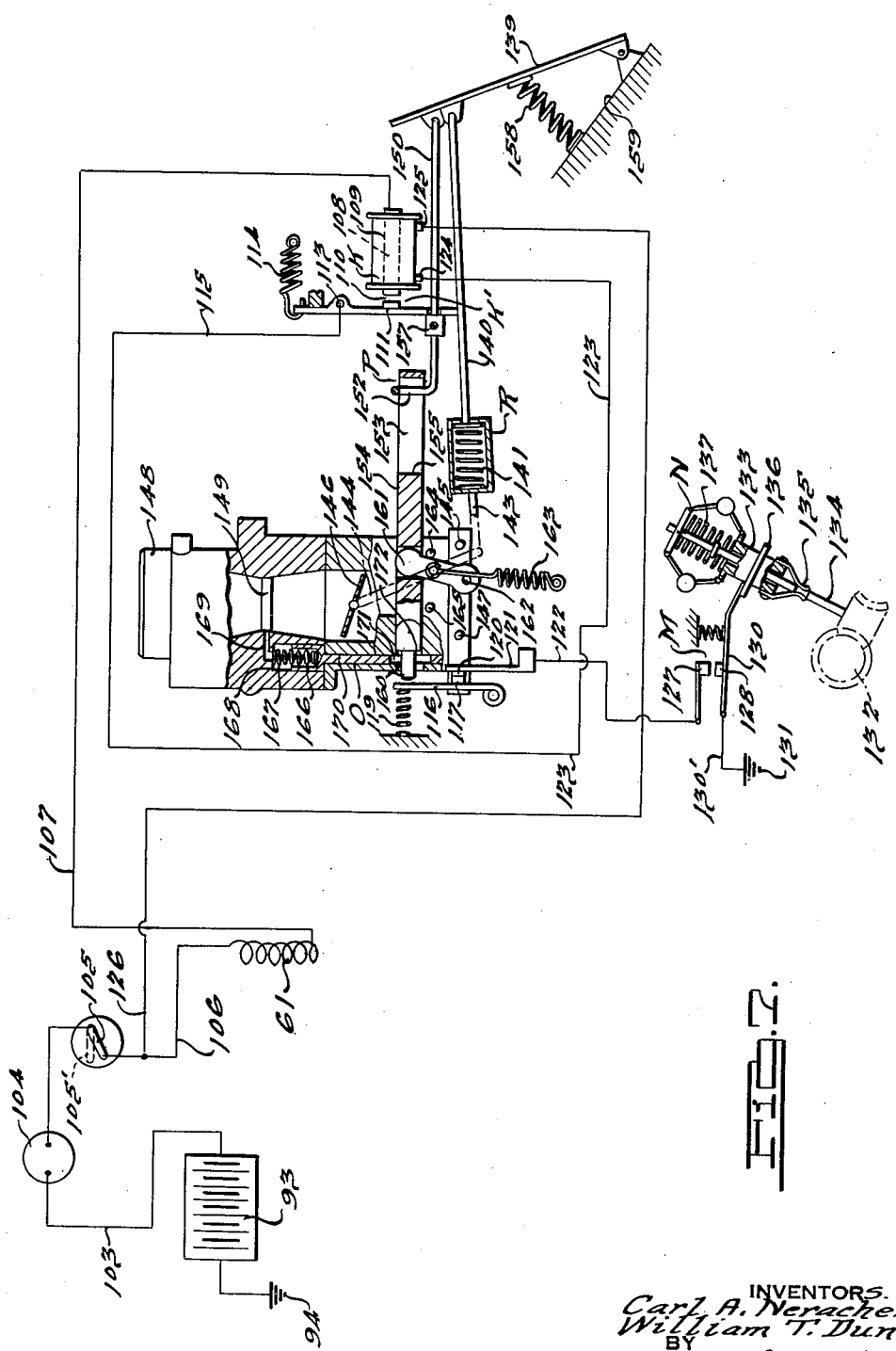
Fig. 7 is a view generally similar to Fig. 6 but illustrating a modified arrangement in which the relay control of Fig. 6 is omitted.

Referring now to our control system shown in Fig. 6, we have provided a relay circuit for controlling energization of coil 61 although the relay circuit may be eliminated as shown in Fig. 7. The provision of the relay circuit has certain advantages, especially in accommodating energization of coil 61 with a greater current than is supplied to the other controlling circuits thereby conserving electrical energy and prolonging the life of the switch points in the system.

In Fig. 6 the usual storage battery 93 is electrically interposed between ground 94 and conductor 95 which extends to one terminal 96 of the switch H of relay J. The other terminal 98 is carried by the swinging piece 99 operable, when relay coil 100 is energized, to close switch H. Terminal 98 extends by conductor 101 either to the terminal 70e, collector ring 66 and coil 61 of Figs. 3 and 4 or else directly to coil 61 of Fig. 5. In other words, Fig. 6 represents a control system for either coil 61 of Fig. 3 or 5 as these embodiments function in the same general manner.

The electromagnetic relay circuit for effecting energization of device F or F' comprises ground 94 to battery 93 thence by conductor 95 and relay switch H to conductor 101, coil 61, conductor 69 and ground 102.

Branching from conductor 95 is a conductor 103 extending through ammeter 104 to ignition switch 105 which is shown closed, the open position being illustrated at 105'. From this ignition switch there extends a conductor 106 to relay coil 100, thence by conductor 107 to one end of the stationary iron core 108 of the electromagnetic holding coil 109. The other end of core 108 is, with the parts in their Fig. 6 positions, spaced by a gap 110 from the contact 111 carried by lever 112 pivotally supported at 113 and normally urged into its Fig. 6 position by a tension spring 114. The holding coil 109 and associated lever 112 are generally designated as K, the switch K' thereof comprising contact 111 and core 108.

Conductor 107 extends electrically through core 108 to lever 112, when contact 111 is held in contact with core 108 by energization of coil 109, and thence by conductor 115 to a lever 116 carrying one terminal 117 of a kick-down switch L.

In passing, it is noted that energizing coil 109 will not of itself cause lever 112 to be attracted into engagement with core 108, this being arranged by suitable relationship between the strength of spring 114 and the magnetic flux intensity of coil 109. However, when coil 109 is energized and then the lever 112 is moved to close gap 110, then the magnetic action at core 108 and contact 111 will hold lever 112 in this operated position and it will not move back to its Fig. 6 position until coil 109 is de-energized whereupon spring 114 will act to open up gap 110 and break the circuit between conductors 107 and 115.

The lever 116 is pivotally supported at 118 and may be swung counterclockwise against the restoring action of spring 119 so as to move terminal 117 away from the other terminal 120 of switch L. At such time the switch L is open, terminal 120 being stationary. From this terminal 120, which is carried by conductor support 121 the circuit extends to conductor 122. Branching from conductor 115 is a conductor 123 which leads from one terminal 124 of coil 109. The other coil terminal 125 extends through conductor 126 to the conductor 106 so that, in effect, it is connected to battery 93 under control of ignition switch 105.

The conductor 122 extends to the fixed terminal 127 of a governor switch M, the other terminal 128 being carried by a swinging switch lever 130 which is grounded at 131 through conductor 130'. The switch M is preferably controlled as a function of car travelling speed and to this end a governor N is arranged to operate switch M from its Figure 6 open position to a closed position thereby grounding conductor 122 at 131. By preference the arrangement is such that automatic release of devices F and F'' is insured below a predetermined car speed and automatic engagement of these devices above a predetermined car speed, provided that certain other controls accommodate such operation.

Whenever the car is in forward driving condition the manual sleeve 42 (Figure 3) is either shifted rearwardly to the low range or forwardly to the high range so that by driving a governor from the countershaft 35 in Fig. 3 or from shaft 73 in Fig. 5, it is possible to provide a speed control operated proportionate to the speed of travel of the car. Driven from gear 132 carried by the countershaft 35 in Fig. 3 or by the tailshaft 73 in Fig. 5 is a governor N (Figure 6) of any suitable type, this governor operating a sleeve 133 outwardly along its drive shaft 134 as the car speed reaches a predetermined point, the breakaway being under control of a detent 135 if desired.

The sleeve 133 has a shoulder 136 engaged by the swinging switch piece 130 of the governor switch M. When the car is stationary the detent 135 is engaged and switch M is open. As the car accelerates, the governor eventually reaches its critical speed and detent 135 releases thereby causing switch M to close and ground the conductor 122 at 131. As the car slows down, the governor spring 137 restores the parts to the Fig. 6 position and by proportioning the various parts it is obvious that switch M may be made to function at desired speeds proportionate to car travel. As an example of one arrangement of governor operation and gearing arrangement, the governor may be made to close switch M during car acceleration in first and third respectively at approximately 7 and 15 M. P. H. (miles per hour) in the Fig. 3 arrangement and at around 15 M. P. H. in the Fig. 5 arrangement.

The governor switch of Figure 3 may be closed at two different speeds for the reason that the governor drive gear, as shown in Figure 3 and described above, is located on the countershaft 35. By reason thereof, it will be apparent that for a given engine speed and hence a corresponding speed of the countershaft 35 necessary to close the switch M, the vehicle will be moving faster when in third speed ratio drive than in first speed, it being noted in this connection that the gears 37 and 40 in Figure 3 are in operation when third speed is established and have a ratio of approximately 1:1 whereas the gears 36 and 39 operable when first gear ratio drive is established have an approximate ratio of 1:2. Consequently, the output shaft will be driven at substantially half the speed it will have in third speed ratio drive when the transmission is established in first speed even though the countershaft will have the same speed of rotation in both first and third speed ratio drives.

If desired, the governor in Fig. 3 may be driven from shaft 20 in the manner of the Fig. 5 arrangement. Likewise, if desired, the governor in Fig. 5 may be driven from the countershaft 138 of transmission D' in the manner of the Fig. 3 arrangement. It will also be understood that the governor operating speeds may be made to vary as may be desired from the car speeds given by way of example.

In order to provide further control on the energization of coil 61 as a function of car driving speed and conditions of engine coast and drive, we have provided a kickdown upper limit control generally designated at O and a coast control P for the switch K' of the holding means K.

Referring first to the coast control P, we have provided means for effecting closing of switch K' only when the engine is coasting, this means being preferably arranged as a control functioning with the throttle-adjusting accelerator pedal 139. This pedal operates link 140 which is connected by opposed pre-loaded springs 141, 142 with a second link 143 connected to operate throttle lever 144 from its fully closed Fig. 6 position at stop 145 to a wide open position of throttle valve 146 at which time lever 144 will engage a second stop 147.

Throttle 146 is located according to standard practice for downdraft carburetion between the air intake 148 and the intake manifold Q. The carburetor venturi 149, between air intake 148 and throttle 146, is utilized to control the kick-down as a function of car speed as broadly set forth in the copending application of T. M. Ball, Serial No. 354,055, filed August 24, 1940.

Operatively connected to the pedal 139 is a link 150 freely slidably extending through an opening 151 in lever 112 and having its forward end upturned at 152 and bent over for support and for sliding back and forth in a slot 153 of a switch operating plunger 154, the latter having end walls 155, 156 bounding the ends of slot 153. Link 150 carries an abutment 157 arranged for contact with lever 112 so as to swing the latter to close switch K'. By preference the arrangement is such that pedal 139 may be released to a position fully closing throttle 146, for the customary idling of engine A, without closing switch K'. To this end the pedal, under action of pedal releasing or throttle closing spring 158, is allowed to undertravel the throttle 146 by moving in its throttle-closing direction, away from floor 159, for a secondary range of undertravel movement accommodated by further compression of spring 142, the link 140 moving rearwardly relative to link 143. During this undertravel movement of pedal 139, limited by engagement of link end 152 with face 156, the abutment 157 actuates lever 112 to close switch K' and if coil 109 is energized at such time then the lever 112 will be held magnetically against the core 108 even though pedal 139 is depressed. If the coil is not energized then spring 114 will open switch K' as pedal 139 is depressed to its throttle closed position of Fig. 6 prior to throttle-opening movement. Such arrangement insures energization of coil 61 only during coasting torque through the transmission, and only then provided governor switch M is closed as will presently be apparent.

Ordinarily the lost motion device R, at springs 141, 142, functions as a solid connection between links 140 and 143 during the throttle-adjusting range of pedal 139 but allows the pedal to undertravel the fully closed position of throttle 146 and also to overtravel the fully open position of the throttle when lever 144 abuts the stop 147. At this time the link end 152 abuts wall 155 and further overtravelling depression of pedal 139 beyond its normal throttle opening range, accommodated by further compression of spring 141, will cause plunger 154 to slide forwardly so that the forward end 160 thereof will swing lever 116 against the restoring action of spring 119 to open switch L. When the pedal 139 is released from overtravel to again pick up the throttle 146 for closing the same, switch L will not close by spring 119 until pedal 139 is fully released.

In order to maintain the transmission in kick-down, once switch L has been opened by full depression of pedal 139, until the pedal has been fully released, we have provided a snap-action over-center device comprising a lever 161 pivoted at 162 and engaging plunger 154. An over-center spring 163 acts on lever 161 and yieldingly holds the lever in one of its two positions either against stop 164 as in Fig. 6 or against stop 165 when switch L is open. When plunger 154 moves forwardly spring 163 urges lever 161 to swing counterclockwise and plunger 154 is then moved forwardly to its kick-down position with snap-action to open switch L, lever 161 engaging stop 165. This also de-energizes coil 109 and allows spring 114 to open switch K'. When the pedal 139 is released, plunger 154 remains in the forward kick-down position until link end 152 engages wall 156 approximately at full throttle closing position, further release of pedal 139 for its undertravel movement causing lever 161 to snap to its Fig. 6 position by spring 163 thereby causing switch L to close and causing abutment 157 to close switch K' to restore the top drive provided, of course, that governor switch M is then closed.

As a guard against effecting kick-down above predetermined desired speed, 50 to 60 M.P.H. for example, we provide means for blocking the plunger 154 against its kick-down movement by the control O. This control may be arranged, by proportioning the weight and diameter of a controlling piston 166 and spring 167 acting thereon, so as to act very accurately at a desired car speed, say 50 M.P.H. in the top drive ratio for Fig. 3 and Fig. 5.

Piston 166 is slidable in a cylindrical chamber 168 open at its upper end by conduit 169 to the venturi 149. With such arrangement, at and above 50 M. P. H. car speed, the throttle 146 being always wide open for attempted kick-down, a definite vacuum effect will act on piston 166 so as to overcome restoring spring 167 and raise the piston. This piston has a depending control portion 170 having a slot 171 through which plunger end 160 operates. This plunger 154 has a shoulder 172 so arranged that when the piston 166 is raised until the bottom wall of slot 171 engages plunger end 160, then forward movement of plunger 154 is prevented. Thus attempted kick-down under such conditions is prevented, the link end 152 being brought to a stop at wall 155 approximately at wide open throttle condition.

From the foregoing control system several circuits are formed in addition to the aforesaid electromagnetic relay circuit. For example, there is provided the following governor holding coil circuit: ground 94, battery 93 and conductor 103 to ammeter 104, thence through ignition switch 105 and conductor 126 to coil 109, then through conductors 123 and 115 to switch L and thence through conductor 122 to governor switch M and back to ground 131.

This governor holding coil circuit controls the governor kick-down circuit which is as follows: ground 94, battery 93 and conductor 103 to ammeter 104, thence through ignition switch 105 and conductor 106 to relay coil 100, conductor 107, core 108 thence through switch K' and conductor 115 to switch L, then through conductor 122 to switch M and back to ground 131. It will be apparent that when this circuit is energized, relay coil 100 will cause switch H of relay J to close, thereby closing the electromagnetic relay circuit to energize the coil 61 of the drive control device F or F'. The foregoing circuits may be conveniently designated as follows:

I. Governor kickdown circuit.
II. Governor holding coil circuit.
III. Electromagnetic relay circuit.

Circuit III may be dispensed with and combined with circuit I if desired, as will presently be apparent from the Fig. 7 diagram. However, the provision of the relay circuit III separate from circuits I and II has the advantage that a relatively small current may be taken through circuits I and II thereby protecting the various switch contact points, while a relatively large current is passed through circuit III to enable coil 61 to efficiently hold the frictionally engageable drive control elements 55 and 56 against relative slipping after establishment of the drives controlled by devices F and F'.

A lesser current in circuits I and II than in circuit III may be effected through suitable resistances in circuits I and II such as, for example, forming coils 100 and 109 by relatively high resistance material or by interposing suitable resistance in the circuits I and II.

In the operation of the Fig. 3 transmission, the car at standstill and with ignition switch 105 closed and the engine idling will be accompanied by open circuits I, II and III because governor switch M is open. The driver shifts sleeve 42 to either high or low range and accelerates the car ordinarily but not necessarily above the critical speed of governor N thereby closing switch M. This closes circuit II but circuit I remains open because the driver in accelerating the car depresses accelerator pedal 139 and switch K' remains open. Therefore as long as the engine is delivering power to drive the car, or as long as the pedal 139 is depressed, the car will continue to drive in first or third depending on the setting of shift sleeve 42. As soon as the driver allows the engine to coast, by fully releasing the accelerator pedal when the car speed is such that governor switch M is closed, then abutment 157 swings lever 112 to close switch K' and thereby energize circuit I which, in turn, acts on relay J to cause circuit III to close and bring device F into operation during engine coast. This will then step-up the drive to either second or fourth although the step-up will be delayed until engine coast thereby enabling drive in the slower driving ratio of first or third as long as desired; such arrangement furthermore limiting operation of device F to engine coast whereby this device does not have to act against the engine and is therefore of relatively low torque capacity sufficient to deliver normal engine torque without slipping after it is engaged. Thus the friction elements 55, 56 are protected against destructive friction action and the consumption of electrical energy held to a minimum.

If the car is initially started in first or third and the accelerator pedal fully released at a car speed at which governor switch M is still open, then even though governor switch K' is closed by pedal 139, the coil 61 will not be energized because circuit III is only energized by circuit I which includes the governor switch M which is open under this example.

Once the pedal 139 is fully released at a car speed sufficient to cause switch M to close, circuit II is energized and will hold switch K' closed at the electromagnet core 108 until governor switch M again opens, is in bringing the car to a stop. This function is especially useful in conjunction with the kickdown switch L whereby, when switch M is closed, circuit I, and hence circuit III controlled thereby, may be closed and opened at will.

If the car is initially accelerated in first above the governor critical speed and the engine allowed to coast by full release of pedal 139, then second will automatically become operative during coast. Then if the driver shifts sleeve 42 forwardly to the high range, third will of course be skipped and fourth will be obtained because device F will remain engaged. Ordinarily, especially where the care is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor N directs a downshift on bringing the car to rest. Thus there is automatically provided a favorable torque-multiplying gearing for starting, as in third.

Whenever the car is driving in fourth or second above the governor critical speed but below that car speed at which piston 166 is raised at wide open throttle conditions at venturi 149, switches M and K' being closed, a full depression of the accelerator pedal 139 will cause the transmission to step-down to third or first, the transmission step-up back to fourth or second taking place only during engine coast by release of pedal 139. Such full pedal depression causes link end 152 to engage wall 155 at approximately fully open position of throttle 146 and when the pedal moves into its secondary or kickdown range by accommodation of the lost motion device R then plunger 154 moves forwardly causing the end 160 to swing lever 116 and open the kickdown switch L, which thereby breaks circuit II and causes switch K' to open. During this movement of plunger 154, the snap-action lever 161 throws the plunger forwardly, the spring 163 then holding lever 161 against stop 165 to maintain switch L open until the accelerator pedal is released thereby causing lever end 152 to travel in slot 153 until it picks up plunger 154 at wall 156 and then causes the snap-action lever 161 to restore plunger 154 and switch L to their Fig. 6 positions, such action taking place at substantially fully closed position of throttle 146 and with switch K' remaining open and M remaining closed. Then on full release of the accelerator pedal for undertravel, switch K' is closed and drive step-up effected during engine coast.

When the kickdown of pedal 139 takes place, as aforesaid, opening switch L breaks circuit I and circuit II thereby de-energizing relay coil 100 and opening relay switch H and circuit III to de-energize coil 61 and release device F. As this takes place at open throttle condition, the engine rapidly speeds up under no load until overrunning clutch E engages for the drive in third or first depending on whether the drive was in fourth or second at the time of kickdown. Then when the pedal 139 is fully released, as aforesaid, switch L again closes to restore circuits I and II so that device F is again engaged during engine coast to restore fourth or second as the case may be. This has the advantage of allowing rapid step-down, as in passing a car or in encountering a steep grade, and at the same time the tendency for free-wheeling action of device E is guarded against in restoring fourth or second because as soon as the driver releases pedal 139, after kickdown, the device F becomes active to restore a two-way drive during engine coast.

On bringing the car to a stop when in fourth or second, the governor N opens switch M thereby opening circuits I and III, as well as II, so as to de-energize coil 61 and cause release of device F so that the car will next be started in third or first, assuming that sleeve 42 is left in a given position for high or low range drive.

The foregoing arrangement does not require torque reversal, as by ignition interruption in the aforesaid Neracher et al. application, in order to release device F by kickdown or when bringing the car to a stop because device F operates frictionally rather than by positive engagement of interlocking parts requiring relief of torque load for release. Our arrangement is therefore more fool-proof and simplified and is of particular advantage in that we have eliminated a source of many troubles ordinarily experienced in friction drive controls because our device F engages only during engine coast and is therefore protected against destructive wear and does not require customary high pressure engagement of the friction drive control elements 56, 57.

If, during drive of the car in fourth, for example, the car speed exceeds the speed at which piston 166 is raised by suction at full open position of throttle 146, then kickdown by plunger 154 is prevented because when pedal 139 is then fully depressed, the plunger shoulder 172 will engage the lower end of piston portion 170 and plunger end 160 cannot be moved to open switch L and the car will continue to drive in fourth. The same function occurs to prevent kickdown from second to first at a speed less than when driving in fourth according to the gear ratio variation between fourth and second. As soon as the car speed diminished below the critical speed of device O, then spring 167 will restore piston 166 to its Fig. 6 unlocking position and kickdown may then take place. However, switch L is controlled by plunger 154 and piston 166 cannot close or open this switch.

When it is desired to drive the car in reverse, sleeve 42 is shifted to its Fig. 3 neutral position and the reverse idler 47 is shifted to engage gears 38 and 46 for the reverse drive. As long as the accelerator pedal 139 is depressed so as to cause the engine to transmit driving torque through the transmission, then the reverse drive will continue through pinion 28, gear 34 and clutch E even though a car speed should be attained to cause governor N to close switch M, assuming the selection of a governor which will so function. Under such conditions, if the pedal 139 is fully released then the switch K' is engaged to operate device F during engine coast and thereby step-up the reverse drive. Such drive occurs from pinion 28 through device F to gear 40 thence to gear 37 and through the reversing train 38, 47 and 46, clutch E overrunning.

When the car is parked, then sleeve 42 and gear 47 are left in neutral and ignition switch 105 is opened and all circuits are open.

Our arrangement furthermore accommodates a simple arrangement for obtaining a no-back whereby backward roll of the car is prevented as when stopping on a hill. If sleeve 42 is left engaged for a forward drive in either high or low range and suitable means provided for maintaining sleeve F engaged, then backward roll of the car is prevented due to a lock-up condition in transmission D because of tendency to establish two drives therethrough from shaft 20 to shaft 27. One such drive tendency is through third or first relationship to pinion 28 and the other is from countershaft 35 through clutch E to pinion 28.

Referring to Fig. 6A we have shown one manner of modifying the Fig. 6 system to accommodate the no-back action. Leading at any convenient point from circuit I as from conductor 107, is a branch conductor 173 leading to ground 174 through a normally open switch S which is preferably mounted for convenient manipulation by the vehicle driver, as on the usual instrument panel 175. This switch comprises a fixed terminal 176 and a spring switch conductor 177. A rod 179 is fitted with an abutment 179 and an operating handle 180 so that when the driver pulls the knob 180 the switch S will close and preferably remain closed until it is again pushed in to restore the switch to its illustrated position.

When switch S is added to the Fig. 6 system, as indicated in Fig. 6A, closing switch S energizes circuit I independently of switches K', L, and M so that relay J causes circuit III to close and thereby energize coil 61 to engage device F for the aforesaid no-back action or at such other time as the driver desires to overrule the switches K', L, and M in energizing coil 61. In Fig. 6A the conductor 173 is branched from conductor 107 at a point along the latter between relay coil 109 and the holding device K. Such arrangement requires the ignition switch 105 to be closed in order to energize coil 61 by closing switch S.

In Fig. 6B the same switch S is branched by conductor 173 from circuit I at some point between ignition switch 105 and battery 93 as between ammeter 104 and switch 105. With this arrangement the car may be left standing headed up a hill and switch S left closed to bring the aforesaid no-back into operation without necessarily maintaining switch 105 closed, or the latter switch may have a separate position other than position 105' to accommodate branch conductor 173 for supply from the battery as will be readily understood.

Referring to Fig. 6C we have illustrated a control system for coil 61 of device F or F' which is identical with Fig. 6 except that engagement of switch K' will take place when pedal 139 is released for throttle closing without undertravelling the closed throttle position of the pedal. In this instance the spring 142 is dispensed with. In Fig. 6C just as pedal 139 nears its released limit to fully close throttle 146, except of course for the necessary idling of the engine which is always provided, abutment 157 engages lever 112. Therefore switch K' will be closed during the very last part of throttle closing and energization of coil 61 during engine coast is insured as before. Just as before, operation of device F or F' takes place under light load, the engine slowing down to thereby naturally synchronize the plates 55 and 56 for smooth action. The Fig. 6C arrangement operates just as set forth for the Fig. 6 arrangement. In each instance switch K' will not close until pedal 139 is fully released. Obviously the controls of Fig. 6A or 6B may be embodied in the Fig. 6C arrangement just as for the Fig. 6 system.

Because of the ease with which transmission D may be made to step-down from fourth to third, by means of the kickdown incident to a full depression of the accelerator pedal, we preferably provide a relatively fast drive between the engine and car driving ground wheels when in fourth. This is conveniently obtained by employing a relatively fast axle so that a direct drive in fourth through transmission D is approximately equivalent to present day overdrive ratio or about the same as the drive in Fig. 5 when conventional transmission D' is in direct and transmission G is operating in overdrive, it being understood that under such conditions the car equipped with the Fig. 5 transmission would have a correspondingly slower driving axle. Under such conditions the car performance between top speed and kickdown would be substantially the same.

In the operation of the Fig. 5 arrangement, the car may be accelerated from rest in first, second, or third by appropriate well known manipulation of transmission D' and shaft 20' will drive shaft 73 at 1 to 1 ratio through overrunning clutch E'. In any such driving ratio the car may be driven indefinitely but when the pedal 139 is fully released, provided the car speed is such that governor switch M is closed, then device F' will be energized during engine coast to hold the sun gear 83 for effecting the overdrive between shafts 20' and 73, this being a two-way drive. The conditions of kickdown at transmission G are just as for device F, the device F' releasing and the engine speeding up under open throttle to pick-up the clutch E' for stepping down the drive.

Ordinarily the transmission D' will be left in high or direct when making temporary stops, as for signal lights, the car always then starting in direct for transmissions D' and G and automatically stepping up to overdrive at transmission G delayed however until the driver releases the accelerator pedal when above the critical speed of the governor N just as for the Fig. 3 arrangement. Of course, the driver may, if desired, initially accelerate the car in first or second and then obtain a low-overdrive combination or a second-overdrive combination during engine coast above the governor critical speed instead of a direct-overdrive combination as in initially accelerating the car in direct-direct combination. The aforesaid combinations refer, of course, to conditions in transmissions D' and G respectively.

The Fig. 6 system operates exactly the same for the Fig. 5 arrangement as set forth for the Fig. 3 arrangement, conditions of operation and release of device F' being the same as for device F, except as noted below, so that such operation during various phases of drive, kickdown, etc. need not be repeated.

When operating the Fig. 5 arrangement for reverse drive of the car, by manipulating the conventional low-reverse gear of transmission D' (by shifting gear 181 rearwardly to mesh with reverse idler 182) then as an incident to such shift, the sleeve 76 is shifted rearwardly to clutch teeth 75 and 74 thereby locking out the overrunning clutch E'. At the same time the sleeve 76 releases annulus gear 79 at teeth 78 so that if the governor switch M closes during reverse drive to energize device F' no harm will be done because the annulus is free to turn unloaded. Normally the sleeve 76 is clutched forwardly with teeth 78, by well-known spring means so that when transmission D' is shifted out of reverse the sleeve 76 will again clutch with teeth 78. The conventional manual dash control is also preferably provided for sleeve 76 so that the seeve may be shifted between its two positions at teeth 78 or 74 independenty of the reverse setting of transmission D'. Such arrangement permits manual permanent two-way direct in transmission G independent of controlling operation of device F'. Such controls for sleeve 76 are commercially well known in the art, and are illustrated for example in the application of C. A. Neracher et al. Serial No. 186,146, filed January 21, 1938, now Patent No. 2,229,337, issued January 21, 1941, or E. F. Webb, Serial No. 216,003, filed June 27, 1938, now Patent No. 2,236,657, issued April 1, 1941.

In those instances where it is desired to cut out or render the device F' inoperative whenever the sleeve 76 is moved rearwardly to clutch with teeth 74, either manually or by reverse setting of transmission D', especially but not necessarily in arrangements where the sleeve 76 is continuously splined to the annulus gear 79 as at 78 in Fig. 5A, means may be provided to cut out the operation of device F' whenever shaft 20' is locked to shaft 73 for a two way direct drive. For such arrangement we have provided a switch T comprising a fixed terminal 184 carried by insulating support 185 and a second terminal 186 carried by insulating support 187 and plunger 188 so arranged that switch T will be opened and remain open whenever sleeve 76 is clutched with teeth 74. Switch T is interposed between ground 131 and governor switch M such that whenever switch T is closed the Fig. 6 or Fig. 6C system will function as previously set forth but whenever switch T is open then circuits I, II, and III are rendered inoperative and device F' cannot be made to function to hold sun gear 83 stationary.

In the Fig. 5 or Fig. 5A mechanism, the aforesaid no-back may be obtained by incorporating the arrangement of Fig. 6A or Fig. 6B with the Fig. 6 or Fig. 6C control system and with sleeve 76 shifted to clutch with teeth 78 and transmission D' in a forward drive or neutral setting. Under such conditions, with device F' energized by the dash switch S, backward roll of the car tends to transmit direct drive from shaft 73 through clutch E' to shaft 20' and also a reduction drive from shaft 73 through sleeve 76 and the planetary pinions 80 to carrier 81 and shaft 20'.

In Fig. 5 the governor N operates directly proportional to car speed independently of the speed ratio drive between the engine and shaft 73. This has certain advantages inasmuch as it does not tend to close switch M on accelerating the car from standstill in reverse, low or possibly in second, assuming of course that the relationship of governor action to car speed accommodates such arrangement. The selection of the governor may vary widely according to performance desired and, if desired, the Fig. 5 governor drive may be employed at shaft 20 in Fig. 3. If the governor in Fig. 5 will close switch M at 15 to 20 M. P. H. in direct at transmission D', then of course, it would not be unusual to accelerate the car to this speed in second for automatic step-up to second-overdrive combination upon full release of the pedal 139. Then on shift to direct in transmission D' the drive would be a direct-overdrive combination.

Referring now to Fig. 7 we have illustrated a control system which is functionally similar to Fig. 6 and Fig. 6C in controlling devices F or F' but which omits the relay circuit between conductor 95 and ground 102, relay coil 100 being replaced by the coil 61 of devices F or F'. In Fig. 7, circuit I of Fig. 6 and Fig. 6C therefore takes on the added function of circuit III of Fig. 6 such that closing circuit I will directly energize coil 61. Likewise the coil 61 is de-energized for step-down drive relation whenever any one of the switches M, L or K' is open. Apart from the direct energizing control of coil 61, the Fig. 7 operation is identical with that set forth for Fig. 6 or Fig. 6C in controlling the devices F or F'. It will furthermore be apparent that the switch S of Fig. 6A and Fig. 6B are equally applicable to Fig. 7 as to Fig. 6 and are intended to also comprise modifications of Fig. 7. Likewise the Fig. 5A modification is also applicable to Fig. 7 in the same manner as to Fig. 6. In employing the Fig. 7 arrangement, the coil end 69 of Figs. 3 and 5 is not grounded. Therefore in Fig. 3 the coil end 69 should pass to a second collector ring just like the ring 66 so that the circuit may be protected against grounding at the transmission. The second collector ring will have an electrical contact brush and terminal just as in the assembly shown in Fig. 4 so as to include coil 61 between conductors 106 and 107. In applying the Fig. 7 circuit to Fig. 5, no collector ring is necessary as coil 61 is stationary. In such instance, coil end 69 will simply pass, insulated from the transmission, to a second casing terminal as for 68 in Fig. 5 so that coil 61 will be included in the circuit between conductors 106 and 107. We have illustrated Fig. 7 omitting the undertravel as in Fig. 6C but the undertravel may be provided if desired.

Figure 8:
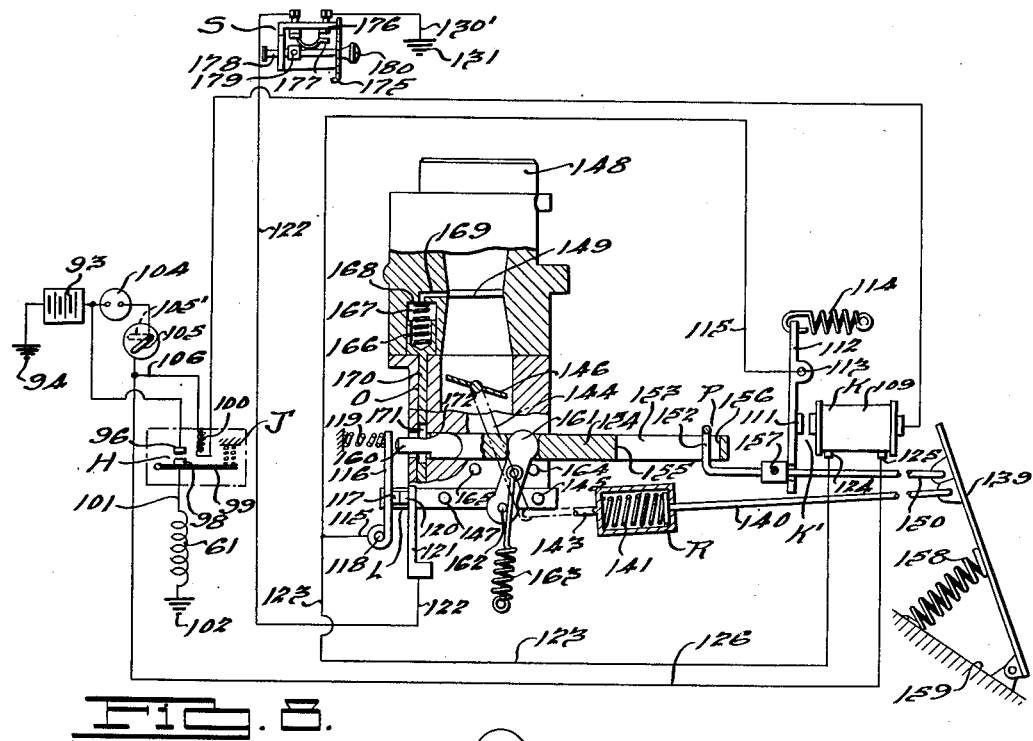
Fig. 8 is a further view generally similar to Fig. 6 but illustrating another modified control system embodying driver controlled means instead of the governor controlled means of Fig. 6.

Referring now to Fig. 8 we have illustrated a control system for the coil 61 of device F or F' in which the governor N of Fig. 6 or Fig. 6C is replaced by the driver operable dash switch S of Fig. 6A or Fig. 6B. The system is otherwise identical to Fig. 6 or Fig. 6C and if desired, the relay circuit may likewise be omitted as in Fig. 7 which would amount to replacing the governor N of Fig. 7 with the switch S.

The switch S has preselective control on the transmission and affords the driver with a control to render the device F or F' either operative or inoperative as to the functioning of holding means K and kickdown switch L.

In the operation of the Fig. 8 system if the driver desires to cut out the functioning of device F or F'' he simply pushes knob 180 inwardly, as in Fig. 8, and then the coil 61 cannot be energized. The car may be driven, however, in all speed ratios which do not require operation of device F or F'' electromagnetically. If he desires the system to operate, he pulls knob 180 to close switch S but coil 61 will not be energized until pedal 139 is fully released. The kickdown control is just as set forth for Fig. 6 or Fig. 6C and the entire system operates substantially as previously set forth except that the manual switch 180 now takes on the functions of the governor and may be operated manually in approximately the same manner. It is noted that switch K' cannot be maintained closed magnetically until after switch S is closed and pedal 139 has been fully released just as for the operation by governor switch M which is now replaced by switch S. Furthermore, as in Fig. 6 or Fig. 6C, once the kickdown switch L is opened thereby causing switch K' to open, the step-up drive is not again effected until the pedal 139 is fully released for engagement of device F or F'' on coast. The aforesaid no-back will operate as aforesaid because, with pedal 139 released to close switch K', closing switch S will therefore energize relay J and cause device F or F'' to operate electromagnetically. This no-back is readily releasable by opening switch S but with switch 105 turned on. If desired, a second dash switch may be added to the Fig. 8 system just as in Fig. 6B so that coil 61 may be energized for no-back control with the ignition switch 105 open. In Fig. 8 we have illustrated the Fig. 6C arrangement omitting undertravel but undertravel as in Fig. 6 may be provided as desired.

Figure 9:
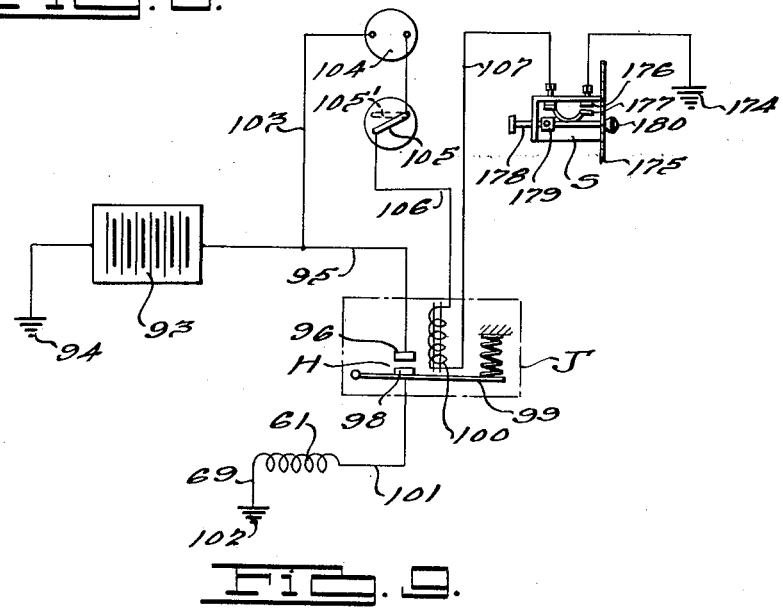
Fig. 9 is another view generally corresponding to Fig. 6 but illustrating a further modified control system in which the holding coil and governor of Fig. 6 are omitted.

Referring to Fig. 9 we have illustrated a further modified control system for device F or F'' in which energization of this device is controlled simply by a driver operated switch S. This system incorporates circuit III of Fig. 6 and circuit I only to conductor 107 where grounding of this conductor to complete the circuit is under control of the dash switch S without any governor, kickdown, or holding coil in the system. This system is very simple and inexpensive to build but, of course, requires manual control to effect operation and release of device F or F''.

In operation of the Fig. 9 system, the operator may leave switch S open so as to render device F or F'' inoperative. When switch S is closed then coil 61 immediately operates by the action of relay J, the driver preferably closing switch J during engine coast. When driving in a ratio with F or F'' operating, step-down may be instantly obtained by opening switch S to de-energize coil 61 and release device F or F''. Obviously the electromagnetic relay circuit may be omitted and coil 61 substituted for coil 100 as in Fig. 7 if desired.

Referring to Fig. 10 we have illustrated a system modifying the Fig. 6 or Fig. 6C arrangement by the omission of the holding coil K and by incorporating a somewhat modified form of kickdown control. The electromagnetic relay circuit III is arranged just as in Fig. 6 or Fig. 6C and circuit I is also the same as far as conductor 107 whence this circuit extends directly through switches L and M.

Branching from conductor 107 is a swinging conductor 190 of a switch U which, when closed, grounds this conductor at 191. Switch U is under control of the piston rod flange 192 of piston 166 such that the switch is closed when the piston is raised.

The plunger 154 now carries a notched latch 193 which, when the plunger is projected forwardly for kickdown, engages flange 192 and thereby prevents piston 166 from closing switch U once kickdown takes place.

In Fig. 10 the device F or F'' will be energized when the car is brought up to a speed which causes governor N to close switch M and de-energized on bringing the car to a stop. A full depression of pedal 139 will open switch L for the step-down change, the step-up not being restored, by control of snap-action link 161, until full release of the accelerator pedal. Therefore while coil 61 may be energized by governor switch M during engine drive, the larger amount of driving conditions for kickdown and return to the step-up ratio will be limited to engine coast. This system is somewhat of a compromise in the interest of obtaining maximum simplicity. Upon kickdown, latch 193 prevents piston 166 from raising to close switch U which would energize coil 61 by grounding coil 100 at 191 and hence close the electromagnetic relay circuit. Also, after driving with device F or F'' operating, should piston 166 raise by suction, then even though switch L is opened by kickdown of pedal 139, the coil 61 will remain energized because switch U will be closed thereby grounding conductor 107 independently of switch L. Here again the relay circuit could be omitted and coil 61 substituted for coil 100 as in Fig. 7. Also, if desired, the arrangements of Fig. 6A, 6B or 5A may readily be used with the Fig. 10 system. The Fig. 10 arrangement is illustrated without undertravel but obviously such arrangement may be provided.

Referring to the system shown in Fig. 11 we have omitted switch L of Fig. 6 or Fig. 6C, the conductor 122 leading directly to conductor 115 or 123 which is now its extension. The system is further simplified by the omission of the snap-action lever 161. Circuit III remains the same as in Fig. 6. Circuit II is substantially the same except that switch L is omitted. Circuit I is likewise the same except for the same change.

In Fig. 11 the link 150 now carries a kick-down abutment 193 and is connected, with necessary freedom of movement to allow pedal 139 to operate, directly to plunger 154 without the snap-action lever 161 of Fig. 6 or Fig. 6C.

Operation of device F or F'' is effected as in Fig. 6 or Fig. 6C by closing of switch M and full release of pedal 139. For kickdown, when pedal 139 is at full throttle opening position then abutment 193 is positioned close to lever 112 which is swung to open switch K'. If the piston 166 is down, then pedal 139 may move through overtravel thereby causing switch K' to open and de-energize coil 61. If piston 166 is up, then overtravel of pedal 139 is blocked at shoulder 172 and abutment 193 cannot act to open switch K'. Therefore switch K' acts as a combined holding switch and kickdown switch. After kickdown a full release of the pedal 139 is necessary to energize coil 61 by abutment 157 during engine coast. Here also, the relay circuit may be omitted and the modifications of Figs. 6A, 6B or 5A be employed if desired.

Referring now to Figs. 12 to 17 we have illustrated a modified control for the Fig. 3 transmission in which electro-magnetic control devices are employed for the high and low driving ranges in lieu of the shift sleeve 42.

Referring to Fig. 12 the gear 40 now carries a second coil 194 for controlling the device V which is similar to device F and when energized will clutch gear 40 to the hub 41' splined to shaft 20. Likewise gear 39 has the similar electro-magnetic device W comprising coil 195 for clutching this gear with shaft 20. We have provided a remote shift arrangement for selectively energizing devices V and W or for shifting gear 47 into reverse drive association with gears 38 and 46, such arrangement being illustrated in Figs. 13 to 16.

Mounted on the post 200 of steering wheel 201 is a housing bracket 202 having a T-slot comprising lateral portion 203 and vertical portion 204 for accommodating shifting control movement of a lever 205 which has its inner end pivoted on a horizontal pin 206. This pin is carried by the parallel arms 207, 208 between which lever 205 is swingingly disposed, these arms being formed as a rigid upper part of vertical shaft 209 rotatably journalled at 210 in housing 202 and seated vertically by a flange 203' formed between shaft portion 209 and arms 207, 208. The shaft 209 is yieldingly urged downwardly to seat at flange 203' by a spring 211. At the outer end of arm 208 there is provided a detent ball 212 yieldingly urged by a spring 213 into one of three detents 214, 215, 216 depending on whether lever 205 is positioned in neutral (solid line showing in Figs. 13, 14 and 15) or pushed to swing downwardly about pivot 206 for low range operation, or pulled to swing upwardly about pivot 206 for high range operation. For such movements of lever 205 in slot 203, the shaft 209 and arms 207, 208 remain fixed.

When lever 205 is swung downwardly for low range operation, the lever engages plunger 217 for closing low range switch 218 and when lever 205 is swung upwardly for high range operation, the lever engages plunger 219 for closing high range switch 220. When the lever is in neutral, switches 218 and 220 are open. The switches 218, 220 respectively energize the electromagnetic clutching devices W and V respectively, for drive control functionally corresponding to shift of sleeve 42 rearwardly and forwardly in Fig. 3.

When reverse is desired, the driver pushes lever 205 from neutral in slot portion 204, this action causing arms 207, 208 and shaft 209 to rotate counterclockwise, in Fig. 13, as a unit, switches 218 and 220 remaining open. This rotation of shaft 209 mechanically shifts the reverse idler gear 47 into mesh with gears 38, 46 for the reverse drive by reason of the lever and link system 221, 222, 223 and 224 somewhat diagrammatically illustrated in Fig. 16.

It will be understood that the coils 195 and 194 of devices W and V are respectively energized by contacts similar to 70ª in Fig. 4, these devices having collector rings 225, 226 for energization control. In Fig. 12 the device F is controlled according to any of the embodiments hereinbefore set forth.

Referring to Fig. 17 we have illustrated a wiring diagram suitable for controlling devices V and W in response to movement of control lever 205. From the aforesaid ignition switch 105 there extends a conductor 227 to switch 218 thence by conductor 228 to coil 195 of device W grounded at 229. Branching from conductor 227 is a conductor 230 which extends to switch 220 thence through coil 194 of device V and ground 231. It will be apparent that coils 194 and 195 will be selectively energized when lever is moved to close switches 220 and 218 respectively, the current being supplied to conductor 227 by battery 93 just as aforesaid.

In the operation of the Fig. 12 system, the driver need not, unless he so desires, operate the clutch pedal except for shift to reverse. For high and low range shifting the lever 205 is manipulated to close switches 220 and 218 respectively. The device F functions just as before. Also, by leaving the lever 205 in its high range, all starts and stops for ordinary driving may be made with the functions as previously set forth when sleeve 42 is left at its high range position. By superimposing the Fig. 17 control system on any of the previously described control systems for device F, the resulting system will provide complete control for the transmission of Fig. 12 as will be readily understood.

In each of the embodiments of our invention the overtravel spring 141 may be omitted, if desired, and links 140, 143 connected as one solid piece. With such arrangement the link 150 will be arranged to push plunger 154 forwardly enough prior to full throttle opening so as to open switch L or switch K' in Fig. 11 by the time the throttle is wide open, thereby effecting kickdown.

We claim:

1. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement under control of the vehicle driver between a first position which causes said engine and driving structure to drive the vehicle in said slow drive and a second position which causes said engine and driving structure to coast with accompanying overrun of said device and release of said slow drive; power operating means operable to effect said frictional engagement of said drive control elements thereby to establish said fast drive; and control means for controlling operation of said power means as a function of movement of said pedal such that said drive-establishing operation of said power means is effected by the positioning of said pedal in its said second position and such that said drive-establishing operation of said power means is prevented by the positioning of said pedal in its said first position.

2. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement from a throttle-closing released position to other throttle-opening positions; power operating means operable to effect said engagement of said drive control elements thereby to establish said fast drive; and control means for controlling operation of said power means as a function of movement of said pedal such that said drive-establishing operation of said power means is effected by the positioning of said pedal in its said released position and prevented by the positioning of said pedal in said other positions.

3. In a motor vehicle drive according to claim 1; second control means operable in response to predetermined speed of travel of the vehicle for controlling operation of said power means by the first said control means.

4. In a motor vehicle drive according to claim 2; second control means operable in response to predetermined speed of travel of the vehicle for controlling operation of said power means by the first said control means such that said drive-establishing operation of said power means will not be effected by positioning said pedal in its said released position unless the vehicle is travelling at or above said predetermined speed.

5. In a motor vehicle drive according to claim 2; second control means operable in response to predetermined speed of travel of the vehicle for overruling the first said control means so as to render said power operating means inoperative as the vehicle is brought to rest thereby to effect release of said drive control elements.

6. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including electromagnetic drive-control means comprising frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement under control of the vehicle driver between a first position which causes said engine and driving structure to drive the vehicle in said slow drive and a second position which causes said engine and driving structure to coast with accompanying overrun of said device and release of said slow drive; and control means for controlling energization of said electromagnetic drive-control means as a function of movement of said pedal such that said drive control elements are relatively engaged by the positioning of said pedal in its said second position and such that drive-establishing engagement of said drive control elements is prevented by the positioning of said pedal in its said first position.

7. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including electromagnetic drive-control means comprising frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement from a throttle-closing released position to other throttle-opening positions; and control means for controlling energization of said electromagnetic drive-control means as a function of movement of said pedal such that said drive control elements are relatively engaged by the positioning of said pedal in its said released position and such that drive-establishing engagement of said drive control elements is prevented by the positioning of said pedal in said other positions.

8. In a motor vehicle drive according to claim 6; second control means operable in response to predetermined speed of travel of the vehicle for controlling energization of said electromagnetic drive-control means by the first said control means.

9. In a motor vehicle drive according to claim 7; second control means operable in response to predetermined speed of travel of the vehicle for controlling energization of said electromagnetic drive-control means by the first said control means such that drive-establishing engagement of said drive control elements will not be effected by positioning said pedal in its said released position unless the vehicle is travelling at or above said predetermined speed.

10. In a motor vehicle drive according to claim 7; second control means operable in response to predetermined speed of travel of the vehicle for overruling the first said control means so as to effect release of said drive-control elements in bringing the vehicle to rest.

11. In a motor vehicle drive according to claim 1; said control means comprising means operating in response to said drive-establishing positioning of said pedal in its said second position for maintaining said drive control elements relatively engaged when said pedal is thereafter positioned in its said first position, said first position being also one which causes said engine and driving structure to drive the vehicle in said fast drive when said engageable drive control elements are established therein.

12. In a motor vehicle drive according to claim 2; said control means comprising means operating in response to said drive-establishing positioning of said pedal in its said released position for maintaining said engagement of said drive control elements when said pedal is thereafter positioned in said other positions said other positions being positions which cause said engine and driving structure to drive the vehicle in said fast speed drive when established therein.

13. In a motor vehicle drive according to claim 1; said control means comprising means operating in response to said drive-establishing positioning of said pedal in its said second position for maintaining said drive control elements relatively engaged when said pedal is thereafter positioned in its said first position, said first position being also one which causes said engine and driving structure to drive the vehicle in said fast drive when said engageable drive control elements are established therein; and second control means operable in response to predetermined speed of travel of the vehicle for controlling operation of said power means by the first said control means.

14. In a motor vehicle drive according to claim 2; said control means comprising means operating in response to said drive-establishing positioning of said pedal in its said released position for maintaining said engagement of said drive control elements when said pedal is thereafter positioned in said other positions said other positions being positions which cause said engine and driving structure to drive the vehicle in said fast speed drive when established therein; and second control means operable in response to predetermined speed of travel of the vehicle for controlling operation of said power means by the first said control means such that said drive-establishing operation of said power means will not be effected by positioning said pedal in its said released position unless the vehicle is travelling at or above said predetermined speed.

15. In a motor vehicle drive according to claim 2; said control means comprising means operating in response to said drive-establishing positioning of said pedal in its said released position for maintaining said engagement of said drive control elements when said pedal is thereafter positioned in said other positions said other positions being positions which cause said engine and driving structure to drive the vehicle in said fast speed drive when established therein; and second control means operable in response to predetermined speed of travel of the vehicle for overruling the first said control means so as to render said power operating means inoperative as the vehicle is brought to rest thereby to effect release of said drive control elements.

16. In a motor vehicle drive according to claim 6; said control means comprising means operating in response to said drive-establishing positioning of said pedal in its said second position for maintaining said drive-control elements relatively engaged when said pedal is thereafter positioned in its said first position, said first position being also one which causes said engine and driving structure to drive the vehicle in said fast drive when said engageable drive control elements are established therein.

17. In a motor vehicle drive according to claim 7; said control means comprising means operating in response to said drive-establishing positioning of said pedal in its said released position for maintaining said engagement of said drive control elements when said pedal is thereafter positioned in said other positions said other positions being positions which cause said engine and driving structure to drive the vehicle in said fast speed drive when established therein.

18. In a motor vehicle drive according to claim 6; said control means comprising means operating in response to said drive-establishing positioning of said pedal in its said second position for maintaining said drive control elements relatively engaged when said pedal is thereafter positioned in its said first position, said first position being also one which causes said engine and driving structure to drive the vehicle in said fast drive when said engageable drive control elements are established therein; and second control means operable in response to predetermined speed of travel of the vehicle for controlling energization of said electromagnetic drive-control means by the first said control means.

19. In a motor vehicle drive according to claim 7; said control means comprising means operating in response to said drive-establishing positioning of said pedal in its said released position for maintaining said engagement of said drive control elements when said pedal is thereafter positioned in said other positions said other positions being positions which cause said engine and driving structure to drive the vehicle in said fast speed drive when established therein; and second control means operable in response to predetermined speed of travel of the vehicle for controlling energization of said electromagnetic drive-control means by the first said control means such that drive-establishing engagement of said drive control elements will not be effected by positioning said pedal in its said released position unless the vehicle is travelling at or above said predetermined speed.

20. In a motor vehicle drive according to claim 7; said control means comprising means operating in response to said drive-establishing positioning of said pedal in its said released position for maintaining said engagement of said drive control elements when said pedal is thereafter positioned in said other positions said other positions being positions which cause said engine and driving structure to drive the vehicle in said fast speed drive when established therein; and second control means operable in response to predetermined speed of travel of the vehicle for overruling the first said control means so as to effect release of said drive-control elements in bringing the vehicle to rest.

21. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement under control of the vehicle driver for controlling adjustment of the engine throttle; means accommodating movement of said pedal throughout a primary range of movement in adjusting said throttle between the limits of throttle closing and opening positions for causing said engine and driving structure to drive the vehicle in said slow drive, and accommodating movement of said pedal in a secondary range of movement undertravelling said primary range for causing said engine and driving structure to coast with accompanying overrun of said device and release of said slow drive; power operating means operable to effect said engagement of said drive control elements thereby to establish said fast drive; and control means for controlling operation of said power means as a function of movement of said pedal such that said drive-establishing operation of said power means is effected by movement of said pedal in said secondary undertravelling range and prevented by movement of said pedal in said primary range.

22. In a motor vehicle drive according to claim 21; and second control means operable in response to predetermined speed of travel of the vehicle for controlling operation of said power means by the first said control means.

23. In a motor vehicle drive according to claim 21; and second control means operable in response to predetermined speed of travel of the vehicle for controlling operation of said power means by the first said control means such that said drive-establishing operation of said power means will not be effected by movement of said pedal in said secondary undertravelling range unless the vehicle is travelling at or above said predetermined speed.

24. In a motor vehicle drive according to claim 21; and second control means operable in response to predetermined speed of travel of the vehicle for overruling the first said control means so as to render said power operating means inoperative as the vehicle is brought to rest thereby to effect release of said drive control elemetns.

25. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including electromagnetic drive-control means comprising frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement under control of the vehicle driver for controlling adjustment of the engine throttle; means accommodating movement of said pedal throughout a primary range of movement in adjusting said throttle between the limits of throttle closing and opening positions for causing said engine and driving structure to drive the vehicle in said slow drive, and accommodating movement of said pedal in a secondary range of movement undertravelling said primary range for causing said engine and driving structure to coast with accompanying overrun of said device and release of said slow drive; and control means for controlling energization of said electromagnetic drive-control means as a function of movement of said pedal such that said drive control elements are relatively engaged by the movement of said pedal in said secondary undertravelling range and such that drive-establishing engagement of said drive control elements is prevented by movement of said pedal in said primary range.

26. In a motor vehicle drive according to claim 25; and second control means operable in response to predetermined speed of travel of the vehicle for controlling energization of said electromagnetic drive-control means by the first said control means.

27. In a motor vehicle drive according to claim 25; and second control means operable in response to predetermined speed of travel of the vehicle for controlling energization of said electromagnetic drive-control means by the first said control means such that drive-establishing engagement of said drive control elements will not be effected by movement of said pedal in said secondary undertravelling range unless the vehicle is travelling at or above said predetermined speed.

28. In a motor vehicle drive according to claim 25; and second control means operable in response to predetermined speed of travel of the vehicle for overruling the first said control means so as to effect release of said drive-control elements in bringing the vehicle to rest.

29. In a motor vehicle drive according to claim 25; said control means comprising means operating in response to said drive-establishing movement of said pedal in its said secondary undertravelling range for maintaining said drive control elements relatively engaged when said pedal is thereafter moved in its said primary range.

30. In a motor vehicle drive according to claim 25; said control means comprising means operating in response to said drive-establishing movement of said pedal in its said secondary undertravelling range for maintaining said drive control elements relatively engaged when said pedal is thereafter moved in its said primary range; and second control means operable in response to predetermined speed of travel of the vehicle for controlling energization of said electromagnetic drive-control means by the first said control means.

31. In a motor vehicle drive according to claim 25; said control means comprising means operating in response to said drive-establishing movement of said pedal in its said secondary undertravelling range for maintaining said drive control elements relatively engaged when said pedal is thereafter moved in its said primary range; and second control means operable in response to predetermined speed of travel of the vehicle for controlling energization of said electromagnetic drive-control means by the first said control means such that drive-establishing engagement of said drive control elements will not be effected by movement of said pedal in said secondary undertravelling range unless the vehicle is travelling at or above said predetermined speed.

32. In a motor vehicle drive according to claim 25; said control means comprising means operating in response to said drive-establishing movement of said pedal in its said secondary undertravelling range for maintaining said drive control elements relatively engaged when said pedal is thereafter moved in its said primary range; and second control means operable in response to predetermined speed of travel of the vehicle for overruling the first said control means so as to effect release of said drive-control elements in bringing the vehicle to rest.

33. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted to be depressed by the operator for movement from a released throttle-closing position through a throttle-opening range of movement to a fully-depressed kickdown position; power operating means operable to effect said engagement of said drive control elements thereby to establish said fast drive; drive-establishing control means for controlling operation of said power means as a function of movement of said pedal such that said drive-establishing operation of said power means is effected by the positioning of said pedal in its said released position and prevented by the positioning of said pedal in said throttle-opening range; and kickdown control means operable in response to movement of said pedal to its said kickdown position for controlling operation of said power operating means to effect release of said drive control elements thereby to step-down the drive from said fast drive to said slow drive.

34. In a motor vehicle according to claim 33; means operable in response to predetermined speed of travel of the vehicle for controlling operation of said power means by said drive-establishing control means.

35. In a motor vehicle according to claim 33; means operable in response to predetermined speed of travel of the vehicle for controlling operation of said power means by said drive-establishing control means such that said drive-establishing operation of said power means will not be effected by positioning said pedal in its said released position unless the vehicle is travelling at or above said predetermined speed.

36. In a motor vehicle according to claim 33; means operable in response to predetermined speed of travel of the vehicle for overruling said drive-establishing control means so as to render said power operating means inoperative as the vehicle is brought to rest thereby to effect release of said drive control elements.

37. In a motor vehicle according to claim 33; means operating in response to said drive-establishing positioning of said pedal in its said released position for maintaining said engagement of said drive control elements when said pedal is thereafter positioned in said throttle opening range.

38. In a motor vehicle according to claim 33; means operating in response to said drive-establishing positioning of said pedal in its said released position for maintaining said engagement of said drive control elements when said pedal is thereafter positioned in said throttle opening range; means operable in response to predetermined speed of travel of the vehicle for controlling operation of said power means by said drive-establishing control means such that said drive-establishing operation of said power means will not be effected by positioning said pedal in its said released position unless the vehicle is travelling at or above said predetermined speed.

39. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including electromagnetic drive-control means comprising frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted to be depressed by the operator for movement from a released throttle-closing position through a throttle-opening range of movement to a fully-depressed kickdown position; drive-establishing control means for controlling energization of said electromagnetic drive control means as a function of movement of said pedal such that said drive control elements are relatively engaged by the positioning of said pedal in its said released position and such that drive-establishing engagement of said drive control elements is prevented by movement of said pedal in said throttle-opening range; and kickdown control means operable in response to movement of said pedal to its said kickdown position for controlling energization of said electromagnetic drive-control means to effect release of said drive control elements thereby to step-down the drive from said fast drive to said slow drive.

40. In a motor vehicle according to claim 39; means operable in response to predetermined speed of travel of the vehicle for controlling energization of said electromagnetic drive-control means by said drive-establishing control means.

41. In a motor vehicle according to claim 39; means operable in response to predetermined speed of travel of the vehicle for controlling energization of said electromagnetic drive-control means by said drive-establishing control means such that drive-establishing engagement of said drive control elements will not be effected by positioning said pedal in its said released position unless the vehicle is travelling at or above said predetermined speed.

42. In a motor vehicle according to claim 39; means operable in response to predetermined speed of travel of the vehicle for overruling said drive-establishing control means so as to effect release of said drive-control elements in bringing the vehicle to rest.

43. In a motor vehicle according to claim 39; means operating in response to said drive-establishing positioning of said pedal in its said released position for maintaining said engagement of said drive control elements when said pedal is thereafter positioned in said throttle opening range.

44. In a motor vehicle according to claim 39; means operating in response to said drive-establishing positioning of said pedal in its said released position for maintaining said engagement of said drive control elements when said pedal is thereafter positioned in said throttle opening range; means operable in response to predetermined speed of travel of the vehicle for controlling energization of said electromagnetic drive-control means by said drive-establishing control means such that drive-establishing engagement of said drive control elements will not be effected by positioning said pedal in its said released position unless the vehicle is travelling at or above said predetermined speed.

45. In a motor vehicle drive according to claim 33; means for preventing said operation of said kickdown control means from effecting step-down in the drive as aforesaid when the vehicle is travelling above a predetermined speed in said fast drive.

46. In a motor vehicle drive according to claim 39; means for rendering said kickdown control means ineffective to step-down the drive as aforesaid when the vehicle is travelling above a predetermined speed in said fast drive.

47. In a drive for a motor vehicle having a throttle-controlled engine; a change speed transmission for driving the vehicle from the engine; electromagnetically connectable drive-control means adapted when electromagnetically connected to establish a predetermined speed ratio drive in said transmission; a throttle-controlling pedal adapted for movement under control of the vehicle driver from a throttle-closing position of release through a throttle-opening range of movements; electrical circuit means for controlling energization of said electromagnetic drive-control means; a switch comprising a switch operating element adapted for movement from a first position to a second position thereof for controlling said circuit means; means for moving said switch operating element from its said first position to its said second position in response to movement of said pedal to its said throttle-closing position of release; and means for releasably holding said switch operating element in its said second position during movement of said pedal through said throttle-opening range.

48. In a drive for a motor vehicle according to claim 47; means for controlling operation of said holding means thereby to cause said holding means to release said switch operating element.

49. In a drive for a motor vehicle having a throttle-controlled engine; a change speed transmission for driving the vehicle from the engine; electromagnetically connectable drive-control means adapted when electromagnetically connected to establish a predetermined speed ratio drive in said transmission; a throttle-controlling pedal adapted for movement under control of the vehicle driver from a throttle-closing position of release through a throttle-opening range of movement; electromagnetic holding means comprising a pair of switch elements, one being movable between positions of contact and separation with respect to the other; means for moving said movable switch element from one of its positions to the other in response to movement of said pedal to its said throttle-closing position; means controlling energization of said electromagnetic holding means; and electrical circuit means, including said pair of switch elements, for controlling energization of said electromagnetic drive-control means.

50. In a drive for a motor vehicle having a throttle-controlled engine; a change speed transmission for driving the vehicle from the engine; electromagnetically connectable drive-control means adapted when electromagnetically connected to establish a predetermined speed ratio drive in said transmission; a throttle-controlling pedal adapted for movement under control of the vehicle driver from a throttle-closing position of release through a throttle-opening range of movement; electromagnetic holding means comprising a pair of switch elements, one being movable between positions of contact and separation with respect to the other; means for moving said movable switch element from one of its positions to the other in response to movement of said pedal to its said throttle-closing position; electrical circuit means, including said pair of switch elements, for controlling energization of said electromagnetic drive-control means; governor means operable in response to predetermined speed of travel of the vehicle for controlling said circuit means, said governor means comprising a governor operated switch in said circuit means; and means controlling energization of said electromagnetic holding means.

51. In a drive for a motor vehicle having a throttle-controlled engine; a change speed transmission for driving the vehicle from the engine; electromagnetic drive-control means for effecting change speed control in said transmission; a throttle-controlling pedal adapted for movement under control of the vehicle driver from a throttle-closing position of release through a throttle-opening range of movement; electromagnetic holding means comprising a pair of switch elements, one being movable between positions of contact and separation with respect to the other; means for moving said movable switch element from one of its positions to the other in response to movement of said pedal to its said throttle-closing position; electrical circuit means, including said pair of switch elements, for controlling energization of said electromagnetic drive-control means; second electrical circuit means for controlling energization of said electromagnetic holding means; governor means operable in response to predetermined speed of travel of the vehicle for controlling the first said circuit means, said governor means comprising a governor operated switch in said second circuit means.

52. In a drive for a motor vehicle having a throttle-controlled engine; a change speed transmission for driving the vehicle from the engine; electromagnetic drive-control means for effecting change speed control in said transmission; a throttle-controlling pedal adapted for movement under control of the vehicle driver from a throttle-closing position of release through a throttle-opening range of movement; electromagnetic holding means comprising a pair of switch elements, one being movable between positions of contact and separation with respect to the other; means for moving said movable switch element from one of its positions to the other in response to movement of said pedal to its said throttle-closing position; electrical circuit means, including said pair of switch elements, for controlling energization of said electromagnetic drive-control means; second electrical circuit means for controlling energization of said electromagnetic holding means; and governor means operable in response to predetermined speed of travel of the vehicle for controlling each of said circuit means, said governor means comprising a governor operated switch in the first and second said circuit means.

53. In a drive for a motor vehicle having a throttle-controlled engine; a change speed transmission for driving the vehicle from the engine; electromagnetic drive-control means for effecting change speed control in said transmission; a throttle-controlling pedal adapted for movement under control of the vehicle driver from a throttle-closing position of release through a throttle-opening range of movement; an electrical relay circuit including a relay switch for controlling energization of said electromagnetic drive-control means; a second electrical circuit for controlling said relay switch; a switch comprising a switch operating element adapted for movement from a first position to a second position thereof for controlling said second circuit; and means for moving said switch operating element from its said first position to its said second position in response to movement of said pedal to its said throttle-closing position.

54. In a drive for a motor vehicle according to claim 53; means for releasably holding said switch operating element in its said second position during movement of said pedal through said throttle-opening range.

55. In a motor vehicle drive having a throttle-controlled engine and a rotatable driving structure adapted to receive drive from the engine and a rotatable driven structure adapted to transmit drive from the driving structure for driving the vehicle; relatively slow speed reduction driving means, including an overrunning device operably associated therewith, for transmitting relatively slow speed reduction drive from the driving structure to the driven structure; relatively fast speed direct driving means for transmitting relatively fast speed direct drive from the driving structure to the driven structure, including frictionally engageable drive control clutch elements cooperable for relative clutching engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement under control of the vehicle driver between a first position which causes said engine and driving structure to drive the vehicle in said slow drive and a second position which causes said engine and driving structure to coast with accompanying overrun of said device and release of said slow drive; electromagnetic power operating means operable to effect said frictional engagement of said drive control elements thereby to establish said fast drive and control means for controlling operation of said power means as a function of movement of said pedal such that said drive-establishing operation of said power means is effected by the positioning of said pedal in its said second position and such that said drive establishing operation of said power means is prevented by the positioning of said pedal in its said first position.

56. In a motor vehicle drive having a throttle-controlled engine and a rotatable driving structure adapted to receive drive from the engine and a rotatable driven structure adapted to transmit drive from the driving structure for driving the vehicle; relatively slow speed direct driving means, including an overrunning device operably associated therewith, for transmitting relatively slow speed direct drive from the driving structure to the driven structure; relatively fast speed overdrive driving means for transmitting relatively fast speed at an overdrive ratio from the driving structure to the driven structure, including frictionally engageable drive control brake elements cooperable for relative braking engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement under control of the vehicle driver between a first position which causes said engine and driving structure to drive the vehicle in said slow drive and a second position which causes said engine and driving structure to coast with accompanying overrun of said device and release of said slow drive; power operating means operable to effect said frictional engagement of said drive control elements thereby to establish said fast drive; and control means including means independent of the throttle actuated by said pedal for controlling operation of said power means as a function of movement of said pedal such that said drive-establishing operation of said power means is effected by the positioning of said pedal in its said second position and such that said drive-establishing operation of said power means is prevented by the positioning of said pedal in its said first position.

57. In a motor vehicle drive having a throttle-controlled engine and a rotatable driving structure adapted to receive drive from the engine and a rotatable driven structure adapted to transmit drive from the driving structure for driving the vehicle; relatively slow speed reduction driving means, including an overrunning device operably associated therewith, for transmitting relatively slow speed reduction drive from the driving structure to the driven structure; relatively fast speed direct driving means for transmitting relatively fast speed direct drive from the driving structure to the driven structure, including electromagnetic drive-control means comprising magnetically energized drive control clutch elements cooperable for relative clutching engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement under control of the vehicle driver between a first position which causes said engine and driving structure to drive the vehicle in said slow drive and a second position which causes said engine and driving structure to coast with accompanying overrun of said device and release of said slow drive; and control means for controlling energization of said electromagnetic drive-control means as a function of movement of said pedal such that said drive control elements are relatively engaged by the positioning of said pedal in its said second position and such that drive-establishing engagement of said drive control elements is prevented by the positioning of said pedal in its said first position.

58. In a motor vehicle drive having a throttle-controlled engine and a rotatable driving structure adapted to receive drive from the engine and a rotatable driven structure adapted to transmit drive from the driving structure for driving the vehicle; relatively slow speed direct driving means, including an overrunning device operably associated therewith, for transmitting relatively slow speed direct drive from the driving structure to the driven structure; relatively fast speed overdrive driving means for transmitting relatively fast speed at an overdrive ratio from the driving structure to the driven structure, including electromagnetic drive-control means comprising frictionally engageable drive control brake elements cooperable for relative braking engagement therebetween to establish said fast drive and for relative disengagement therebetween to release said fast drive; said device automatically overrunning in response to coast of the driving structure to allow the driven structure to overrun the driving structure thereby to enable establishment of said fast drive; a throttle-controlling pedal adapted for movement under control of the vehicle driver between a first position which causes said engine and driving structure to drive the vehicle in said slow drive and a second position which causes said engine and driving structure to coast with accompanying overrun of said device and release of said slow drive; and control means including means operable by said pedal in moving to said second position for controlling energization of said electromagnetic drive-control means as a function of movement of said pedal such that said drive control elements are relatively engaged by the positioning of said pedal in its said second position and such that drive-establishing engagement of said drive control elements is prevented by the positioning of said pedal in its said first position.

59. In a motor vehicle drive having a driving shaft and a driven shaft coaxial with the driving shaft for transmitting drive therefrom to drive the vehicle; transmission means comprising relatively slow speed driving means, including an overrunning device operably associated therewith, for transmitting relatively slow speed drive from the driving shaft to the driven shaft; said transmission means also comprising relatively fast speed driving means for transmitting relatively fast speed drive from the driving shaft to the driven shaft, including frictionally engageable drive-control elements cooperable for relative engagement therebetween to establish said fast drive and for relative disengagement therebetween to release said fast drive; said device automatically overrunning in response to coast of the driving shaft to allow the driven shaft to overrun the driving shaft thereby to enable establishment of said fast drive; said transmission means automatically locking for no-back vehicle control to prevent backward roll of the vehicle when said drive-control elements are relatively engaged; and means for effecting said relative engagement of said drive control elements thereby to provide said no-back control.

60. In a motor vehicle drive having a driving shaft and a driven shaft coaxial with the driving shaft for transmitting drive therefrom to drive the vehicle; transmission means comprising relatively slow speed driving means, including an overrunning device operably associated therewith, for transmitting relatively slow speed drive from the driving shaft to the driven shaft; said transmission means also comprising relatively fast speed driving means for transmitting relatively fast speed drive from the driving shaft to the driven shaft, including electromagnetic drive-control means comprising engageable drive-control elements cooperable for relative engagement therebetween to establish said fast drive and for relative disengagement therebetween to release said fast drive; said device automatically overrunning in response to coast of the driving shaft to allow the driven shaft to overrun the driving shaft thereby to enable establishment of said fast drive; said transmission means automatically locking for no-back vehicle control to prevent backward roll of the vehicle when said drive-control elements are relatively engaged; and means for controlling energization of said electromagnetic drive-control means thereby to provide said no-back control.

61. In a motor vehicle drive having a driving shaft and a driven shaft coaxial with the driving shaft for transmitting drive therefrom to drive the vehicle; transmission means comprising relatively slow speed driving means, including an overrunning device operably associated therewith, for transmitting relatively slow speed drive from the driving shaft to the driven shaft; said transmission means comprising relatively fast speed driving means for transmitting relatively fast speed drive from the driving shaft to the driven shaft, including electromagnetic drive-control means comprising engageable drive-control elements cooperable for relative engagement therebetween to establish said fast drive and for relative disengagement therebetween to release said fast drive; said device automatically overrunning in response to coast of the driving shaft to allow the driven shaft to overrun the driving shaft thereby to enable establishment of said fast drive; said transmission means automatically locking for no-back vehicle control to prevent backward roll of the vehicle when said drive-control elements are relatively engaged; governor means for controlling energization of said electromagnetic drive-control means such that said drive-control elements are relatively disengaged when the vehicle is at rest; and means to control energization of said electromagnetic means independently of said governor means thereby to effect relative engagement of said drive-control elements for providing said no-back control.

62. In a motor vehicle drive having a driving shaft and a driven shaft coaxial with the driving shaft for transmitting drive therefrom to drive the vehicle; transmission means comprising relatively slow speed driving means, including an overrunning device operably associated therewith, for transmitting relatively slow speed drive from the driving shaft to the driven shaft; said transmission means comprising relatively fast speed driving means for transmitting relatively fast speed drive from the driving shaft to the driven shaft, including frictionally engageable drive-control elements cooperable for relative engagement therebetween to establish said fast drive and for relative disengagement therebetween to release said fast drive; said device automatically overrunning in response to coast of the driving shaft to allow the driven shaft to overrun the driving shaft thereby to enable establishment of said fast drive; said transmission means automatically locking for no-back vehicle control to prevent backward roll of the vehicle when said drive-control elements are relatively engaged; governor means for controlling said fast speed driving means such that said drive-control elements are relatively disengaged when the vehicle is at rest; and means for overruling said governor means to effect relative engagement of said drive-control elements for providing said no-back control.

63. In a motor vehicle drive having a rotatable driving shaft adapted to receive drive from the engine and a rotatable driven shaft adapted to transmit drive from the driving shaft for driving the vehicle; low and high speed gears adapted for selective clutching with the driven shaft; a pair of electromagnetic clutch means for selectively clutching the low and high speed gears respectively with the driven shaft, each one of said pair of clutch means including an energizing coil carried by its respective gear, a core portion drivingly connected to its respective gear, and a magnetically energizeable pressure member; reduction drive means, including an overrunning clutch interposed therein, drivingly connecting the driving shaft with the low and high speed gears for driving these gears from and at a speed slower than that of the driving shaft, said overrunning clutch automatically releasing the reduction drive in response to coast of the driving shaft; and clutch means operable for establishing a direct drive relationship between said driving shaft and said high speed gear.

64. In a motor vehicle drive having a rotatable driving shaft adapted to receive drive from the engine and a rotatable driven shaft adapted to transmit drive from the driving shaft for driving the vehicle; low and high speed gears adapted for selective clutching with the driven shaft; a pair of electromagnetic clutch means for selectively clutching the low and high speed gears respectively with the driven shaft, each one of said pair of clutch means including an energizing coil carried by its respective gear, a core portion drivingly connected to its respective gear and a magnetically energizable pressure member; reduction drive means, including an overrunning clutch interposed therein, drivingly connecting the driving shaft with the low and high speed gears for driving these gears from and at a speed slower than that of the driving shaft, said overrunning clutch automatically releasing the reduction drive in response to coast of the driving shaft; and electromagnetic clutch means operable for establishing a direct drive relationship between said driving shaft and said high speed gear, said drive clutch means including an energizing coil carried by said high speed gear, a core portion drivingly connected to said high speed gear, and a magnetically energizeable pressure member.

65. In a motor vehicle drive according to claim 63; means operable under control of the vehicle driver for effecting selective energizing control of said pair of electromagnetic clutch means.

66. In a motor vehicle drive according to claim 63; means operable under control of the vehicle driver for effecting selective energizing control of said pair of electromagnetic clutch means; and governor controlled means for controlling operation of said direct-drive-establishing clutch means.

67. In a motor vehicle drive according to claim 64; means operable under control of the vehicle driver for effecting selective energizing control of said pair of electromagnetic clutch means; and governor controlled means for controlling operation of said direct-drive-establishing electromagnetic clutch means.

68. In a motor vehicle drive according to claim 63; means shiftable to establish a reverse drive relationship between said shafts for driving the vehicle in reverse; a lever adapted for selective drive-controlling manipulation by the vehicle driver; means operable in response to selective manipulation of said lever for selectively controlling energization of said pair of electromagnetic clutch means and for effecting shift of said shiftable reverse drive means.

69. In a motor vehicle drive according to claim 63; means shiftable to establish a reverse drive relationship between said shafts for driving the vehicle in reverse; a lever adapted for selective drive-controlling manipulation by the vehicle driver; means operable in response to selective manipulation of said lever for selectively controlling energization of said pair of electromagnetic clutch means and for effecting shift of said shiftable reverse drive means; and means for controlling operation of said direct-drive-establishing clutch means independently of manipulation of said lever.

70. In a motor vehicle drive according to claim 64; means shiftable to establish a reverse drive relationship between said shafts for driving the vehicle in reverse; a lever adapted for selective drive-controlling manipulation by the vehicle driver; means operable in response to selective manipulation of said lever for selectively controlling energization of said pair of electromagnetic clutch means and for effecting shift of said shiftable reverse drive means.

71. In a motor vehicle drive according to claim 64; means shiftable to establish a reverse drive relationship between said shafts for driving the vehicle in reverse; a lever adapted for selective drive-controlling manipulation by the vehicle driver; means operable in response to selective manipulation of said lever for selectively controlling energization of said pair of electromagnetic clutch means and for effecting shift of said shiftable reverse drive means; and means for controlling energization of said direct-drive-establishing electromagnetic clutch means independently of manipulation of said lever.

72. In a drive for a motor vehicle having a throttle-controlled engine; a change speed transmission for driving the vehicle from the engine; an electromagnetic drive-control clutch for effecting change speed control in said transmission; a throttle-controlling pedal adapted for depressing movement through a range of throttle-opening to a kickdown position of maximum depressing travel and for releasing movement from said kickdown position through a throttle-closing range of movement; kickdown switch means operable in response to kickdown positioning of said pedal; upshift switch means operable in response to throttle closing movement of said pedal; electrical circuit means under control of said upshift switch means for controlling energization of said electromagnetic drive control clutch; and electrical circuit means under control of said kickdown switch means for controlling energization of said electromagnetic drive-control clutch.

73. In a drive for a motor vehicle having a throttle-controlled engine; a change speed transmission for driving the vehicle from the engine; an electromagnetic drive-control clutch for effecting change speed control in said transmission; a throttle-controlling pedal adapted for depressing movement through a range of throttle-opening to a kickdown position of maximum depressing travel and for releasing movement from said kickdown position through a throttle closing range of movement; kickdown switch means operable in response to kickdown positioning of said pedal; upshift switch means operable in response to throttle closing movement of said pedal governor switch means operable in response to predetermined vehicle driving speed; electrical circuit means under control of said upshift switch means and said governor switch means for controlling energization of said electro-magnetic drive control clutch; and electrical circuit means under control of said governor switch means and said kickdown switch means for controlling energization of said electromagnetic drive-control clutch.

74. In a motor vehicle drive according to claim 1; second control means operable in response to predetermined speed of travel of the vehicle for controlling operation of said power means by the first said control means; means operable to lock-out said overrunning device the said lockout means thereby effecting two-way direct drive connection between said driving and driven structures; and means operable in response to operation of said lock out means for rendering said second control means inoperable.

75. In a motor vehicle drive according to claim 2; second control means operable in response to predetermined speed of travel of the vehicle for controlling operation of said power means by the first said control means such that said drive-establishing operation of said power means will not be effected by positioning said pedal in its said released position unless the vehicle is travelling at or above said predetermined speed; means operable to lock out said overrunning device the said lockout means thereby effecting two-way direct drive connection between said driving and driven structures; and means operable in response to operation of said lock out means for rendering said second control means inoperable.

76. In a motor vehicle drive according to claim 6; second control means operable in response to predetermined speed of travel of the vehicle for controlling energization of said electromagnetic drive-control means by the first said control means; means operable to lock out said overrunning device the said lockout means thereby effecting two-way direct drive connection between said driving and driven structures; and means operable in response to operation of said lock out means for rendering said second control means inoperable.

77. In a motor vehicle drive according to claim 7; second control means operable in response to predetermined speed of travel of the vehicle for controlling energization of said electromagnetic drive-control means by the first said control means such that drive-establishing engagement of said drive control elements will not be effected by positioning said pedal in its said released position unless the vehicle is travelling at or above said predetermined speed; means operable to lock out said overrunning device the said lockout thereby effecting two-way direct drive connection between said driving and driven structures; and means operable in response to operation of said lock out means for rendering said second control means inoperable.

78. In a motor vehicle drive according to claim 1; means selectively operable under control of the vehicle driver for either pre-setting the first said control means for enabling controlling operation of said power means as aforesaid or rendering the first said control means inoperative.

79. In a motor vehicle drive according to claim 6; means selectively operable under control of the vehicle driver when in said slow speed drive for either pre-setting the first said control means for enabling controlling energization of said electromagnetic drive-control means as aforesaid or rendering the first said control means inoperative.

80. In a motor vehicle drive according to claim 1; said control means comprising means operating in response to said drive-establishing positioning of said pedal in its said second position for maintaining said drive control elements relatively engaged when said pedal is thereafter positioned in its said first position; and means selectively operable under control of the vehicle driver for either pre-setting the first said control means for enabling controlling operation of said drive-establishing-means as aforesaid or rendering said drive-establishing-means ineffective.

81. In a motor vehicle drive according to claim 6; said control means comprising means operating in response to said drive-establishing positioning of said pedal in its said second position for maintaining said drive control elements relatively engaged when said pedal is thereafter positioned in its said first position; and means selectively operable under control of the vehicle driver when in said slow speed drive for either pre-setting the first said control means for enabling controlling operation of said energization-control-means and said maintaining-means as aforesaid or rendering the same inoperative.

82. In a motor vehicle drive according to claim 47; means selectively operable under control of the vehicle driver for either pre-setting said circuit means for controlling energization of said electromagnetic drive-control means or rendering the same inoperative.

83. In a motor vehicle drive having a throttle-controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive;

a throttle-controlling pedal adapted to be depressed by the operator for movement from a released throttle-closing position through a throttle-opening range of movement to a fully-depressed kick-down position; power operating means operable to effect said engagement of said drive control elements thereby to establish said fast drive; electrical circuit means for controlling operation of said power operating means; a switch comprising a switch operating element adapted for movement from a first position to a second position thereof for controlling said circuit means; means for moving said switch operating element from its said first position to its said second position in response to movement of said pedal to its said throttle-closing position; means for releasably holding said switch operating element in its said second position during movement of said pedal through said throttle-opening range; and means operable in response to movement of said pedal from its said position of release to the limit of its travel in the direction of throttle-opening for moving said switch operating element from its said second position to its said first position.

84. In a motor vehicle drive according to claim 83; a governor switch operable for controlling said circuit means; and governor means for operating said governor switch.

85. In a motor vehicle drive according to claim 83; a governor switch operable for controlling said holding means; and governor means for operating said governor switch.

86. In a motor vehicle drive according to claim 83; a governor switch operable for controlling said circuit means and said holding means; and governor means for operating said governor switch.

87. In a drive for a motor vehicle having a throttle-controlled engine; a change speed transmission for driving the vehicle from the engine; electromagnetic drive-control means for effecting change speed control in said transmission; a throttle-controlling pedal adapted for movement under control of the vehicle driver from a throttle-closing position of release through a throttle-opening range of movement; electrical circuit means for controlling energization of said electromagnetic drive-control means; a switch comprising a switch operating element adapted for movement from a first position to a second position thereof for controlling said circuit means; means for moving said switch operating element from its said first position to its said second position in response to movement of said pedal to its said throttle-closing position; means for moving said switch operating element from its said second position to its said first position in response to movement of said pedal to the limit of its travel in the direction of said throttle-opening range of movement; and means for releasably holding said switch operating element in its said second position during movement of said pedal through said throttle-opening range.

88. In a drive for a motor vehicle according to claim 87; a governor switch operably interposed in said circuit means in series with the first said switch; and governor means for operating said governor switch.

89. In a drive for a motor vehicle according to claim 87; a governor switch operably interposed in said circuit means in series with the first said switch; governor means for operating said governor switch; and second electrical circuit means including said governor switch for controlling said holding means.

90. In a drive for a motor vehicle; a change speed transmission comprising a pair of forward speed ratio drives and a reverse drive; a pair of electrically operable devices for respectively controlling said forward drives; means shiftable for controlling said reverse drive; a driver operable selector lever; means for mounting said lever for movement in either of two paths relatively transversely of each other; means operably connecting said lever with said shiftable means for effecting shift thereof in response to movement of said lever in one of said paths; a pair of switches operable for respectively controlling energization of said pair of electrically operable devices; and said switches being disposed for selective operation in response to movement of said lever in the other of its said paths.

91. In a drive for a motor vehicle; a change speed transmission comprising a pair of forward speed ratio drives and a reverse drive; a pair of electrically operable devices for respectively controlling said forward drives; means shiftable for controlling said reverse drive; a driver operable selector lever; a movable shaft; means operably connecting said shaft with said shift means so as to effect shift thereof in response to movement of said shaft; means for operably connecting said lever with said shaft to accommodate movement of the lever in either of two paths; a pair of switches selectively operable for respectively controlling energization of said pair of electrically operable devices; said lever-and-shaft connecting means being so constructed and arranged as to move said shaft in response to movement of said lever in one of said paths and to selectively operate said switches, without accompanying movement of said shaft, in response to movement of said lever in the other of said paths.

92. A variable speed transmission comprising two variable speed units in tandem, said units being adapted to provide second, overdrive second, direct and overdrive direct ratios through the transmission, automatically controlled means for establishing at least some of said ratios, a throttle, means controlled by the throttle for overruling the automatically controlled means to effect a downshift from overdrive direct to direct, and manually controlled means for overruling the throttle controlled means to prevent a downshift to direct.

93. In a motor vehicle drive having a throttle controlled engine and a rotatable driving structure adapted to receive drive from the engine and a rotatable driven structure adapted to transmit drive from the driving structure for driving the vehicle; relatively slow speed driving means, including an overrunning device operably associated therewith, for transmitting relatively slow speed drive from the driving structure to the driven structure; relatively fast speed driving means for transmitting relatively fast speed drive from the driving structure to the driven structure, including frictionally engageable drive control elements cooperable for relative engagement therebetween to establish said fast drive and for relative disengagement therebetween to release said fast drive; said device automatically overrunning in response to coast of the driving structure to allow the driven structure to overrun the driving structure thereby to enable establishment of said fast drive; throttle control means operable under control of the vehicle driver in a manner which causes said engine and driving structure to drive the vehicle in said slow speed drive when established therein and operable to cause said engine and driving structure to coast with accompanying overrun of said overrunning device and release of said slow speed drive; power operating means operable to effect said frictional engagement of the said drive control elements thereby to establish said fast speed drive and control means for controlling operation of said power means as a function of operation of said throttle control means such that said drive establishing operation of said power means is effected solely upon operation of said throttle control means to cause coast of said engine and driving structure.

94. In a drive for a motor vehicle having a throttle controlled engine; a change speed transmission for driving the vehicle from the engine; electromagnetic drive control means for effecting change speed control in said transmission; a throttle controlling pedal adapted for movement under control of the vehicle driver from a throttle closing position of release through a throttle opening range of movement; electrical circuit means for controlling energization of said electromagnetic drive control means; a switch comprising a switch operating element adapted for movement from a first position to a second position thereof for controlling said circuit means; means for moving said switch operating element from its said first position to its said second position in response to movement of said pedal to its said throttle closing position of release; means for releasably holding said switch operating element in its said second position during movement of said pedal through said throttle opening range; and kickdown control means operable in response to movement of said pedal from its said position of release to the limit of its travel in the direction of throttle opening for causing said holding means to release said switch operating element.

95. In a drive for a motor vehicle having a throttle controlled engine; a change speed transmission for driving the vehicle from the engine; electromagnetic drive control means for effecting change speed control in said transmission; a throttle controlling pedal adapted for movement under control of the vehicle driver from a throttle closing position of release through a throttle opening range of movement; electrical circuit means for controlling energization of said electromagnetic drive control means; a switch comprising a switch operating element adapted for movement from a first position to a second position thereof for controlling said circuit means; means for moving said switch operating element from its said first position to its said second position in response to movement of said pedal to its said throttle closing position of release; means for releasably holding said switch operating element in its said second position during movement of said pedal through said throttle opening range; a second switch in series with the first said switch and comprising a second switch operating element adapted for movement from a first position to a second position for controlling said holding means and said circuit means in conjunction with the first said switch; and means operable in response to movement of said pedal from its said position of release to the limit of its travel in the direction of throttle opening for moving said second switch operating element from its said first position to its said second position thereby to cause said holding means to release the first said switch operating element.

96. In a drive for a motor vehicle having a throttle controlled engine; a change speed transmission for driving the vehicle from the engine; electromagnetic drive control means for effecting change speed control in said transmission; a throttle controlling pedal adapted for movement under control of the vehicle driver from a throttle closing position of release through a throttle opening range of movement; electrical circuit means for controlling energization of said electromagnetic drive control means; a switch comprising a switch operating element adapted for movement from a first position to a second position thereof for controlling said circuit means; means for moving said switch operating element from its said first position to its said second position in response to movement of said pedal to its said throttle closing position of release; means for releasably holding said switch operating element in its said second position during movement of said pedal through said throttle opening range; and means operable in response to predetermined speed of travel of the vehicle for controlling said releasable holding means.

97. In a drive for a motor vehicle having a throttle controlled engine; a change speed transmission for driving the vehicle from the engine; electromagnetic drive control means for effecting change speed control in said transmission; a throttle controlling pedal adapted for movement under control of the vehicle driver from a throttle closing position of release through a throttle opening range of movement; electrical circuit means for controlling energization of said electromagnetic drive control means; a switch comprising a switch operating element adapted for movement from a first position to a second position thereof for controlling said circuit means; means for moving said switch operating element from its said first position to its said second position in response to movement of said pedal to its said throttle closing position of release; means for releasably holding said switch operating element in its said second position during movement of said pedal through said throttle opening range; governor means operable in response to predetermined speed of travel of the vehicle for controlling said releasable holding means such that said holding means is rendered ineffective to hold said switch operating element as aforesaid below a predetermined speed of travel of the vehicle.

98. In a drive for a motor vehicle having a throttle controlled engine; a change speed transmission for driving the vehicle from the engine; electromagnetic drive control means for effecting change speed control in said transmission; a throttle controlling pedal adapted for movement under control of the vehicle driver from a throttle closing position of release through a throttle opening range of movement; electrical circuit means for controlling energization of said electromagnetic drive control means; a switch comprising a switch operating element adapted for movement from a first position to a second position thereof for controlling said circuit means; means for moving said switch operating element from its said first position to its said second position in response to movement of said pedal to its said throttle closing position of release; means for releasably holding said switch operating element in its said second position during movement of said pedal through said throttle opening range; kickdown control means operable in response to movement of said pedal from its said position of release to the limit of its travel in the direction of throttle opening for causing said holding means to release said switch operating element; and governor means operable in response to predetermined speed of travel of the vehicle for controlling said circuit means, said governor means comprising a governor operated switch disposed in said circuit means in series with the first said switch.

99. In a drive for a motor vehicle having a throttle controlled engine; a change speed transmission for driving the vehicle from the engine; electromagnetic drive control means for effecting change speed control in said transmission; a throttle controlling pedal adapted for movement under control of the vehicle driver from a throttle closing position of release through a throttle opening range of movement; electrical circuit means for controlling energization of said electromagnetic drive control means; a switch comprising a switch operating element adapted for movement from a first position to a second position thereof for controlling said circuit means; means for moving said switch operating element from its said first position to its said second position in response to movement of said pedal to its said throttle closing position of release; means for releasably holding said switch operating element in its said second position during movement of said pedal through said throttle opening range; kickdown control means operable in response to movement of said pedal from its said position of release to the limit of its travel in the direction of throttle opening for causing said holding means to release said switch operating element; governor means operable in response to predetermined speed of travel of the vehicle for controlling said circuit means, said governor means comprising a governor operated switch disposed in said circuit means in series with the first said switch; and second electrical circuit means including said governor operated switch for controlling said holding means.

100. In a drive for a motor vehicle having a throttle controlled engine; a change speed transmission for driving the vehicle from the engine; electromagnetic drive control means for effecting change speed control in said transmission; a throttle controlling pedal adapted for movement under control of the vehicle driver from a throttle closing position of release through a throttle opening range of movement; electrical circuit means for controlling energization of said electromagnetic drive control means; a switch comprising a switch operating element adapted for movement from a first position to a second position thereof for controlling said circuit means; means for moving said switch operating element from its said first position to its said second position in response to movement of said pedal to its said throttle closing position of release; means for releasably holding said switch operating element in its said second position during movement of said pedal through said throttle opening range; kickdown control means operable in response to movement of said pedal from its said position of release to the limit of its travel in the direction of throttle opening for causing said holding means to release said switch operating element, said kickdown control means comprising a kickdown switch disposed in said circuit means in series with the first said switch; and governor means operable in response to predetermined speed of travel of the vehicle for controlling said circuit means, said governor means comprising a governor operated switch in said circuit means in series with said kickdown switch and with the first said switch.

101. In a drive for a motor vehicle having a throttle controlled engine; a change speed transmission for driving the vehicle from the engine; electromagnetic drive control means for effecting change speed control in said transmission; a throttle controlling pedal adapted for movement under control of the vehicle driver from a throttle closing position of release through a throttle opening range of movement; electrical circuit means for controlling energization of said electromagnetic drive control means; a switch comprising a switch operating element adapted for movement from a first position to a second position thereof for controlling said circuit means; means for moving said switch operating element from its said first position to its said second position in response to movement of said pedal to its said throttle closing position of release; means for releasably holding said switch operating element in its said second position during movement of said pedal through said throttle opening range; kickdown control means operable in response to movement of said pedal from its said position of release to the limit of its travel in the direction of throttle opening for causing said holding means to release said switch operating element, said kickdown control means comprising a kickdown switch disposed in said circuit means in series with said first switch; governor means operable in response to predetermined speed of travel of the vehicle for controlling said circuit means, said governor means comprising a governor operated switch in said circuit means in series with said kickdown switch and with the first said switch; and second electrical circuit means including said governor operated switch for controlling said holding means.

102. In an automobile transmission mechanism, the combination with a drive shaft and a driven shaft, of an over-drive adapted to be interposed between said shafts, said over-drive being operatively connected to said driven shaft, a free-wheeling unit interposed between said shafts, and means for operatively connecting or disconnecting said over-drive to said driving shaft, said means being operable in response to the speed of the automobile, means for operatively connecting said driving and driven shafts independently of said over-drive, and means under the control of the operator for interlockingly connecting said drive shaft to said driven shaft by both of said connecting means to thereby hold the automobile against motion by gravity in one direction.

103. In an automobile transmission mechanism, the combination of a drive shaft and a driven shaft, the latter being operatively connected to the driving wheels, of an over-drive associated with said shafts and operatively connected to the driven shaft, a free wheeling unit interposed between said shafts, means for automatically joining and disjoining said over-drive to said driving shaft, means operable independently of said over-drive for operatively connecting said shafts, and means for interlockingly connecting said over-drive to said driving shaft when said other connecting means is in operative engagement to thereby hold said automobile against motion by gravity in one direction.

104. In an automobile transmission mechanism, the combination of a drive shaft and a driven shaft, the latter having a portion formed with clutch teeth, a free wheeling unit interposed between said shafts, a planetary gearing connected to the driven shaft and said drive shaft, a member having clutch teeth drivingly connected with a portion of said planetary gearing, a shiftable clutch member having teeth meshing with the clutch teeth of said driven shaft and said first named member, and means under the control of the operator when the automobile is at rest for connecting the first named member in fixed position to said driven shaft while maintaining all of said clutch teeth in engagement to thereby prevent gravitational movement of the automobile in one direction.

105. In an automobile transmission mechanism, the combination of a drive shaft and a driven shaft, the latter being operatively connected to the driving wheels, a free wheeling unit interposed between said shafts, a planetary gearing being operatively connected to said driving shaft and driven shaft for forming an over-drive, means for directly connecting said driving and driven shafts independently of said over-drive, and manually controlled means for interlockingly connecting said driven to said drive shaft through both of said connecting means when the automobile is at rest to thereby hold the same against gravitational motion in one direction.

106. In a motor vehicle drive having a rotatable driving shaft adapted to receive drive from the engine and a rotatable driven shaft adapted to transmit drive from the driving shaft for driving the vehicle; low and high speed gears adapted for selective clutching with the driven shaft; clutch means operable for selectively clutching the low and high speed gears with the driven shaft; reduction drive means, including an overrunning clutch interposed therein, drivingly connecting the driving shaft with the low and high speed gears for driving these gears from and at a speed slower than that of the driving shaft, said overrunning clutch automatically releasing the reduction drive in response to coast of the driving shaft; electromagnetic clutch means comprising electromagnetically connectible elements operable when electromagnetically connected for establishing a direct drive relationship between said driving shaft and said high speed gear, throttle control means operable to a position to cause the engine and drive shaft to drive the vehicle with one of said low and high speed gears clutched, and operable to a second position which causes the engine and driving structure to coast with accompanying overrun of said overrunning clutch and switch control means operable by said throttle control means for controlling energizing operation of said electromagnetic clutch, said switch control means being operable to effect energization of said electromagnetic clutch and establishment of said direct drive relationship as a function of said throttle control position such that direct drive relationship is substantially immediately established when said throttle control is conditioned in said second position and operate said switch control means.

107. In a motor vehicle drive according to claim 106, means operable in response to predetermined speed of travel of the vehicle for controlling the electromagnetic connection of said electromagnetic clutch means.

108. In a motor vehicle drive having a rotatable driving shaft adapted to receive drive from the engine and a rotatable driven shaft adapted to transmit drive from the driving shaft for driving the vehicle; low and high speed gears adapted for selective clutching with the driven shaft; clutch means operable for selectively clutching the low and high speed gears with the driven shaft; reduction drive means, including an overrunning clutch interposed therein, drivingly connecting the driving shaft with the low and high speed gears for driving these gears from and at a speed slower than that of the driving shaft, said overrunning clutch automatically releasing the reduction drive in response to coast of the driving shaft; electromagnetic clutch means comprising electromganetically connectible elements operable when electromagnetically connected for establishing a direct drive relationship between said driving shaft and said high speed gear; a throttle controlling pedal adapted for movement from a throttle closing released position to other throttle opening positions; control means for controlling the electromagnetic connection of said electromagnetic clutch means as a function of movement of said pedal such that said electromagnetic clutch means is electromagnetically connected to establish said direct drive relationship by the positioning of said pedal in its said released position and such that establishment of said direct drive relationship is prevented by the positioning of said pedal in said other positions.

109. In a motor vehicle drive having a rotatable driving shaft adapted to receive drive from the engine and a rotatable driven shaft adapted to transmit drive from the driving shaft for driving the vehicle; low and high speed gears adapted for selective clutching with the driven shaft; clutch means operable for selectively clutching the low and high speed gears with the driven shaft; reduction drive means, including an overrunning clutch interposed therein, drivingly connecting the driving shaft with the low and high speed gears for driving these gears from and at a speed slower than that of the driving shaft, said overrunning clutch automatically releasing the reduction drive in response to coast of the driving shaft; electromagnetic clutch means comprising electromagnetically connectible elements operable when electromagnetically connected for establishing a direct drive relationship between said driving shaft and said high speed gear; means operable under control of the vehicle driver for effecting electromagnetic connection of said electromagnetic clutch means when one of said high and low speed gears is clutched with the driven shaft thereby establishing a no-back relationship between said shafts for preventing backward roll of the vehicle.

110. In a motor vehicle drive having a rotatable driving shaft adapted to receive drive from the engine and a rotatable driven shaft adapted to transmit drive from the driving shaft for driving the vehicle; low and high speed gears adapted for selective clutching with the driven shaft; clutch means operable for selectively clutching the low and high speed gears with the driven shaft; reduction drive means, including an overrunning clutch interposed therein, drivingly connecting the driving shaft with the low and high speed gears for driving these gears from and at a speed slower than that of the driving shaft, said overrunning clutch automatically releasing the reduction drive in response to coast of the driving shaft; electromagnetic clutch means comprising electromagnetically connectible elements operable when electromagnetically connected for establishing a direct drive relationship between said driving shaft and said high speed gear; means operable in response to predetermined speed of travel of the vehicle for controlling electromagnetic connection of said electromagnetic clutch means; means operable under control of the vehicle driver for overruling said speed responsive control means for effecting electromagnetic connection of said electromagnetic clutch means when one of said high and low speed gears is clutched with the driven shaft thereby establishing a no-back relationship between said shafts for preventing backward roll of the vehicle.

111. In a motor vehicle drive having a throttle controlled engine and a rotatable driving structure adapted to receive drive from the engine and a rotatable driven structure adapted to transmit drive from the driving structure for driving the vehicle; relatively slow speed driving means for transmitting a relatively slow speed drive from the driving structure to the driven structure; relatively fast speed driving means for transmitting a relatively fast speed drive from the driving structure to the driven structure including frictionally engageable drive control elements cooperable for relative engagement therebetween to establish said fast drive and for relative disengagement therebetween to release said fast drive; power operating means operable to effect said frictional engagement of said drive control elements thereby to establish said fast drive; and control means for controlling operation of said power means as a function of throttle condition; said control means including means operable to effect the drive establishing operation of said power means when said throttle is closed to at least engine idling condition and other means operable to prevent said drive establishing operation of said power means when, prior to said closing thereof, said throttle is opened beyond engine idling condition and within substantially the major portion of the remainder of the full operating range of said throttle.

112. A variable speed transmission comprising two variable speed units in tandem, said units being adapted to provide for progressively faster speed ratio drives through the transmission, automatically controlled means for effecting establishment of at least some of said speed ratio drives, throttle controlling means, means controlled by the throttle controlling means for overruling the automatically controlled means to effect a downshift from the fastest speed ratio drive to that speed ratio drive immediately lower therefrom, and manually controlled means for overruling said means controlled by the throttle controlled means to prevent said downshift.

CARL A. NERACHER.
WILLIAM T. DUNN.

REFERENCES CITED

The following references are of record in the file of this patent:

UNITED STATES PATENTS

| Number | Name | Date |
|---|---|---|
| Re. 21,244 | Cotterman | Oct. 24, 1939 |
| 1,124,280 | Brackett | Jan. 12, 1915 |
| 2,016,835 | Nardone et al. | Oct. 8, 1935 |
| 2,042,356 | Nardone | May 26, 1936 |
| 2,051,553 | Fleischel | Aug. 18, 1936 |
| 2,052,430 | Tyler | Aug. 25, 1936 |
| 2,145,008 | Jagersberger | Jan. 24, 1939 |
| 2,159,430 | Dunn | May 23, 1939 |
| 2,193,267 | Burtnett | Mar. 12, 1940 |
| 2,211,534 | Brokes | Aug. 13, 1940 |
| 2,214,100 | Claytor | Sept. 10, 1940 |
| 2,227,696 | Blaylock | Jan. 7, 1941 |
| 2,241,087 | Griswold | May 6, 1941 |
| 2,242,519 | Frank | May 20, 1941 |
| 2,244,133 | Taylor | June 3, 1941 |
| 2,248,133 | Snow | July 8, 1941 |
| 2,257,674 | Dunn | Sept. 30, 1941 |
| 2,257,838 | Claytor | Oct. 7, 1941 |
| 2,279,986 | Griswold | Apr. 14, 1942 |
| 2,281,916 | Claytor | May 5, 1942 |
| 2,292,253 | Thurber | Aug. 4, 1942 |
| 2,292,633 | Griswold | Aug. 11, 1942 |
| 2,313,003 | Nongarou | Mar. 2, 1943 |
| 2,322,479 | Schjolin | June 22, 1943 |
| 2,322,676 | Vincent | June 22, 1943 |